(12) United States Patent
Smith et al.

(10) Patent No.: US 12,214,750 B2
(45) Date of Patent: *Feb. 4, 2025

(54) SYSTEMS AND METHODS FOR A HOUSING EQUIPMENT FOR A SECURITY VEHICLE

(71) Applicant: Axon Enterprise, Inc., Scottsdale, AZ (US)

(72) Inventors: Patrick W. Smith, Scottsdale, AZ (US); Gabriel Othman, Seattle, WA (US); Brandy Shaffer, Scottsdale, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,522

(22) Filed: Oct. 16, 2023

(65) Prior Publication Data

US 2024/0034242 A1 Feb. 1, 2024

Related U.S. Application Data

(63) Continuation of application No. 16/409,571, filed on May 10, 2019, now Pat. No. 11,787,346, which is a
(Continued)

(51) Int. Cl.
*B60R 9/048* (2006.01)
*B64C 39/02* (2023.01)
(Continued)

(52) U.S. Cl.
CPC ......... *B60R 9/048* (2013.01); *B60R 2011/004* (2013.01); *B60R 2300/101* (2013.01);
(Continued)

(58) Field of Classification Search
CPC ............... B60R 9/048; B60R 2011/004; B60R 2300/101; B60R 2300/80;
(Continued)

(56) References Cited

U.S. PATENT DOCUMENTS 5,659,289 A 8/1997 Zonkoski et al.
7,825,790 B2 11/2010 Tallinger
(Continued)

FOREIGN PATENT DOCUMENTS

AU 2012201199 B9 11/2014
GB 2559580 A 8/2018
(Continued)

OTHER PUBLICATIONS

International Searching Authority, International Search Report and Written Opinion for International Patent Application No. PCT/US2019/028568 mailed Sep. 11, 2019.

*Primary Examiner* — Yonel Beaulieu
(74) *Attorney, Agent, or Firm* — Andrew Graham

(57) ABSTRACT

A system for providing security functions to a vehicle may comprise a chassis and a drone. The chassis may be configured to be mounted on top of the vehicle. The chassis may include a drone port for housing a drone. The drone may include a camera. The camera of the drone may be configured to capture images of objects outside of the chassis while the drone is positioned in the drone port. A device including the chassis may be a light bar and further include lights positioned at a periphery of the device.

20 Claims, 7 Drawing Sheets

Related U.S. Application Data continuation-in-part of application No. 16/390,897, filed on Apr. 22, 2019, now abandoned.

(60) Provisional application No. 62/660,439, filed on Apr. 20, 2018.

(51) Int. Cl.
  *B64U 80/86* (2023.01)
  *B60R 11/00* (2006.01)
  *B64U 101/30* (2023.01)

(52) U.S. Cl.
  CPC .......... *B60R 2300/80* (2013.01); *B64U 80/86* (2023.01); *B64U 2101/30* (2023.01); *B64U 2201/20* (2023.01)

(58) Field of Classification Search
  CPC ........ B60R 2300/406; B60R 2300/408; B64C 39/024; B64C 39/02; B64D 47/08; B64U 80/86; B64U 2101/30; B64U 2201/20
  See application file for complete search history.

(56) References Cited

U.S. PATENT DOCUMENTS

| | | |
|---|---|---|
| 8,282,242 B1 | 10/2012 | Sikora |
| 8,948,935 B1* | 2/2015 | Peeters .................. G05D 1/102 709/201 |
| 9,002,313 B2 | 4/2015 | Sink et al. |
| 9,056,676 B1 | 6/2015 | Wang |
| 9,778,653 B1 | 10/2017 | McClintock et al. |
| 9,878,656 B2 | 1/2018 | Gergets et al. |
| 10,692,304 B1 | 6/2020 | Deyaf et al. |
| 2004/0036594 A1 | 2/2004 | Ladow et al. |
| 2009/0152833 A1 | 6/2009 | Johnson |
| 2015/0035437 A1 | 2/2015 | Panopoulos et al. |
| 2016/0042767 A1 | 2/2016 | Araya et al. |
| 2016/0167805 A1 | 6/2016 | McKee et al. |
| 2016/0332748 A1 | 11/2016 | Wang |
| 2017/0253330 A1* | 9/2017 | Saigh .................. G08G 5/0069 |
| 2017/0322551 A1 | 11/2017 | Zang |
| 2018/0050800 A1 | 2/2018 | Boykin et al. |
| 2018/0059660 A1* | 3/2018 | Heatzig .................. B64U 10/14 |
| 2018/0170191 A1 | 6/2018 | Xing et al. |
| 2019/0197369 A1 | 6/2019 | Law et al. |
| 2020/0070717 A1 | 3/2020 | Garden et al. |
| 2020/0094957 A1 | 3/2020 | Sohmshetty et al. |
| 2020/0166929 A1 | 5/2020 | Jiwani et al. |
| 2020/0231279 A1 | 7/2020 | Buyse et al. |
| 2020/0271749 A1 | 8/2020 | Wu et al. |
| 2020/0284883 A1 | 9/2020 | Ferreira et al. |
| 2020/0294385 A1 | 9/2020 | Lowe et al. |
| 2020/0385116 A1 | 12/2020 | Sabripour et al. |
| 2020/0406860 A1 | 12/2020 | Mai et al. |
| 2021/0064903 A1* | 3/2021 | Lim ........................ G06F 18/22 |
| 2021/0109546 A1 | 4/2021 | Christiana et al. |
| 2021/0129989 A1 | 5/2021 | Schuett et al. |
| 2021/0243410 A1 | 8/2021 | Ekin |
| 2021/0300549 A1* | 9/2021 | Beloussov ............. B64D 47/02 |
| 2021/0380016 A1 | 12/2021 | Cha et al. |
| 2022/0111975 A1 | 4/2022 | Hwang et al. |
| 2022/0238028 A1 | 7/2022 | Tanaka |
| 2024/0111305 A1* | 4/2024 | Bradley ............... G06Q 50/265 |

FOREIGN PATENT DOCUMENTS

| | | |
|---|---|---|
| WO | 2005030531 A1 | 4/2005 |
| WO | 2017185378 A1 | 11/2017 |
| WO | 2021216397 A1 | 10/2021 |

* cited by examiner

SYSTEMS AND METHODS FOR A HOUSING EQUIPMENT FOR A SECURITY VEHICLE

This U.S. application is a continuation of U.S. application Ser. No. 18/409,571, now U.S. U.S. Pat. No. 11,787,346 B2, which is a continuation-in-part of U.S. application Ser. No. 16/409,571, now abandoned, which claims priority to U.S. Provisional Patent Application No. 62/660,439. Embodiments of the present invention relate to vehicles used in security enforcement.

FIELD OF INVENTION

Embodiments of the present invention relate to vehicles used in security enforcement.

BACKGROUND

Security vehicles, and in particular, police vehicles are outfitted with a lot of equipment. The equipment is added to stock vehicles. Outfitting a vehicle takes time and effort. Equipment must be installed under the hood, in the truck, and in the cabin. The inner lining of the ceiling, floor coverings, and dash board, among other things, must be removed to install equipment and wiring. When equipment fails, depending on the equipment and its location in the vehicle, the vehicle must be at least partially disassembled to test, repair, and/or replace the equipment and/or wiring. Maintenance of even minor systems may take major effort depending on the location of the equipment in the vehicle. Security departments would benefit from a system that provided all of the functions of a security vehicle and that did not have to be installed on the interior of the vehicle. Security departments would further benefit from a system that could be maintained without disassembling the vehicle.

SUMMARY

In various embodiments, a chassis for a security vehicle may comprise one or more lights, one or more radios, one or more antennas, wherein the chassis is mounted on top of the vehicle. The chassis may also comprise one or more bays for receiving a piece of equipment, wiring between the bays for at least one of power and data, and an exterior housing. The chassis may also comprise a drone port. The chassis may also comprise a window that permits passage of light from an exterior of the chassis to an interior of the chassis. The window may be positioned adjacent the drone port to enable a camera of a drone in the drone port to capture images of objects outside of the chassis. The chassis may also comprise a camera positioned proximate to the window to capture images of objects and events around the chassis. The drone port may be positioned asymmetrically within the chassis. The chassis may include a storage system configured to receive and store the captured images of objects from the camera of the drone.

In various embodiments, a system for providing security functions to a vehicle may comprises a chassis and a drone. The chassis may be configured to be mounted on top of the vehicle and include a drone port for housing the drone. The drone may include a camera. While the drone is positioned in the drone port, the camera of the drone may be configured to capture images of objects outside of the chassis. The drone port may include a window through which the camera of the drone is configured to capture the images of objects outside of the chassis. The drone port may be positioned at an end of the chassis. The end may be configured to be mounted on a passenger side of the vehicle. The drone may be configured to receive flight data comprising indicia of an object in the captured images to be tracked while the drone is positioned in the drone port. The flight data may include indicia of one or more of a relative position and a motion response for the drone. The relative position may include at least one of an azimuth value, an altitude value, a relative distance value, and geofencing data. The motion response for the drone may include indicia of a position adjustment for the drone to automatically make upon detecting movement of the tracked object. The position adjustment may correspond to one of maintaining a position, following the tracked object, and returning to the drone port. The drone may be configured to launch from the chassis and automatically track the object based on the received flight data. Automatically tracking the object based on the received flight data may include automatically positioning the drone at a position indicated in the flight data. The drone may be configured to store image data in a memory of the drone, the image data including the images captured while the drone is positioned in the drone port. The camera of the drone may be configured to capture image data after the drone launches from the chassis and to store the image data in memory with image data including the images captured while the drone is positioned in the drone port. The camera of the drone may be configured to capture image data continuously before and after launch of the drone. The system may comprise a mobile data terminal in communication with the drone, the mobile data terminal disposed within the vehicle and configured to transmit flight data to the drone while the drone is positioned in the drone port. The mobile data terminal may be in communication with the drone via the chassis. Capturing the images may comprise processing image data comprising the captured images to detect the object in the image data, generating indicia of the detected object in the image data, and outputting the indicia of the detected object from the drone. The drone may be configured to detect movement of the object to be tracked and adjust a position of the drone when the movement of the object is detected. The chassis may comprise a communication circuit configured to communicate with a remote computing device and the drone may be configured to receive flight data from the remote computing device via the communication circuit while the drone is positioned in the drone port. The drone may be configured to automatically read license plates in the captured images of objects outside of the chassis. The chassis may include a storage system and the drone may be configured to transmit image data comprising the captured images to the storage system. The chassis may include a computing device configured to detect an object in the captured images and the drone may be configured to receive flight data comprising indicia of the detected object from the computing device while the drone is positioned in the drone port. The chassis may comprise a water removal device positioned adjacent the window to selectively remove water from the window. The water removal device may comprise at least one wiper. The water removal device may comprise a vent configured to direct air from inside the drone port across an external surface of the window. The chassis may comprise a second drone port and the system further includes a second drone including a camera, wherein while the second drone is positioned in the second drone port, the camera of the second drone may be configured to capture images of second objects outside of the chassis. The drone may be configured to capture images in a first direction from the chassis while positioned in the drone port and the second drone may be configured to capture images in a second direction from the chassis while positioned in the drone port, the first direction different from the second direction. The first direction may be opposite the second direction.

In embodiments, a method performed by a drone to provide security functions for a vehicle comprises capturing image data with a camera of the drone while the drone is positioned in a drone port of a chassis configured to be mounted on the vehicle, receiving flight data comprising indicia of an object in the captured image data to be tracked, launching from the chassis, and tracking the object based on the received flight data. The image data may be captured through a window of the drone port prior to launch. Capturing image data may comprise processing the captured image data to detect the object in the image data, generating indicia of the detected object in the image data, and outputting the indicia of the detected object from the drone. The indicia of the detected object may be output to a display positioned within the vehicle. The flight data may be received from a user interface device positioned within the vehicle after the indicia of the detected object is output to the user interface device. The indicia of the detected object may be output to a remote computing device. The flight data may be received by the drone prior to launching from the chassis. The flight data may be received from a remote computing device in communication with the drone via a radio communication circuit positioned in the chassis. The flight data may be received from a mobile data terminal disposed within the vehicle. The flight data may include at least one of a relative position and a motion response for the drone. The relative position may include at least one of an azimuth value, an altitude value, a relative distance value, and geofencing data. The motion response for the drone may include indicia of a position adjustment for the drone to automatically make upon detecting movement of the tracked object. The position adjustment may correspond to one of maintaining a position, following the tracked object, and returning to the drone port. Tracking the object may include automatically positioning the drone at a position relative to the tracked object based on the flight data. Tracking the object may include following the tracked object. Tracking the object may include maintaining a position of the drone. Tracking the object includes returning to the drone port. Tracking the object include detecting movement of the tracked object and adjusting a position of the drone when the movement of the tracked object is detected. Tracking the object may comprise capturing image data with the camera after launch and storing the image data captured after launch continuously with the image data captured while the drone was positioned in the drone port. Launching the drone may include selecting a payload among a plurality of payloads prior to launch. The plurality of payloads may include two or more of a second camera, an infrared camera, radio communication equipment, a spotlight, and rescue equipment. The method may comprise applying a fixed mode prior to launching from the chassis. The method may comprise applying an aerial mode and launching from the chassis in accordance with the aerial mode.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE SEVERAL VIEWS OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF INVENTION

Many security vehicles and most police vehicles have a light bar. A light bar may be integrated with a chassis (e.g., frame, box) that receives and supports most, if not all, of the equipment that is presently installed in the interior of a vehicle. Equipment installed in the chassis would not need to be installed in the interior of the vehicle. Equipment installed in the chassis would be readily accessible for providing maintenance without disassembling the interior of the vehicle. The doors and lids on a chassis may be opened to provide access to the equipment installed in the chassis.

Figure 1:
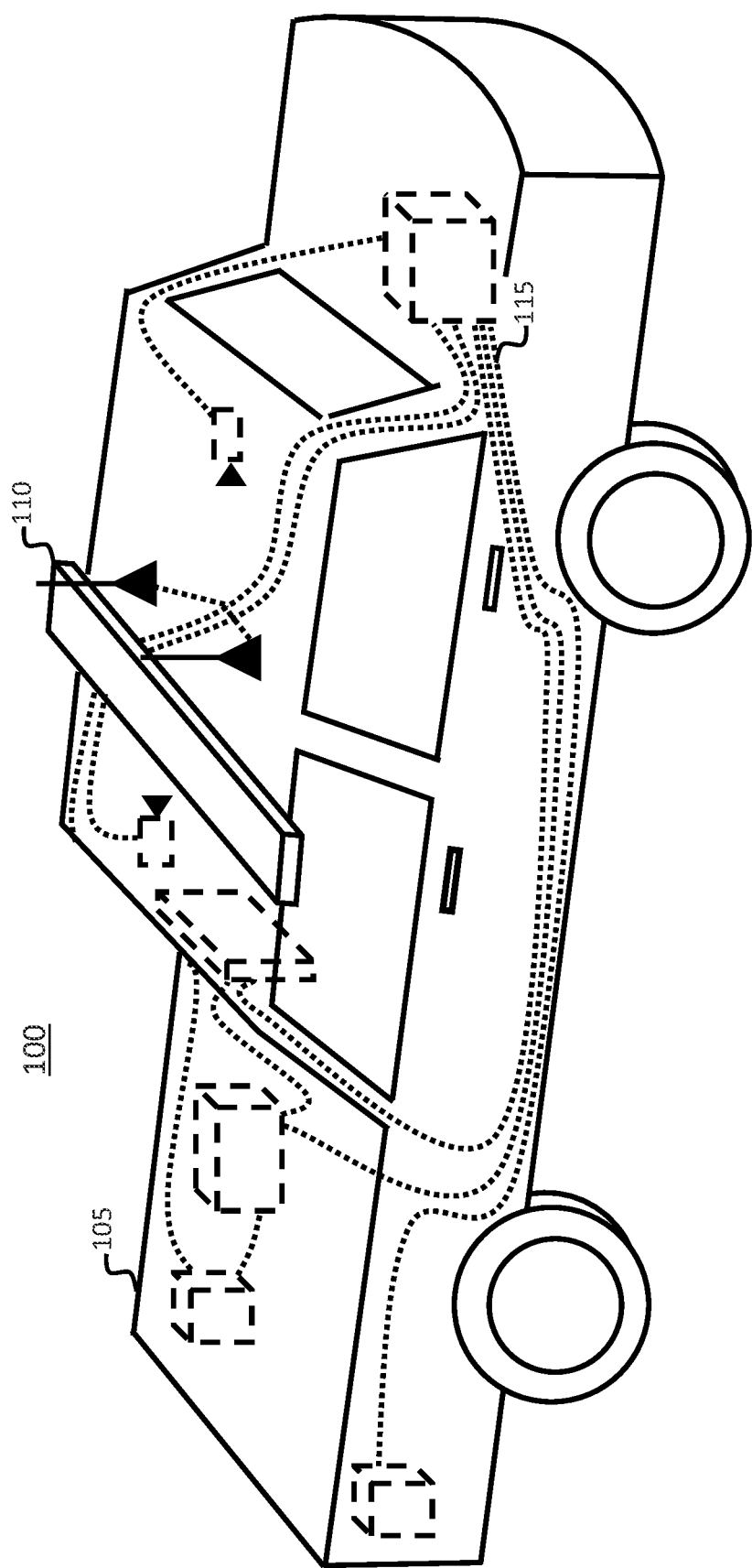
FIG. 1 is a diagram of a vehicle that shows equipment and wiring on the interior of the vehicle.

Embodiments according to various aspects of the present disclosure involve a security vehicle 105 with a lightbar 110 as shown in FIG. 1. FIG. 1 also shows wiring 115 between various equipment. Such wiring 115 requires extensive effort to install, maintain, and replace within vehicle 105. Embodiments according to various aspects of the present disclosure eliminate the need for most—if not all—of such wiring. Wiring may be eliminated by moving equipment into a light bar itself.

Figure 2:
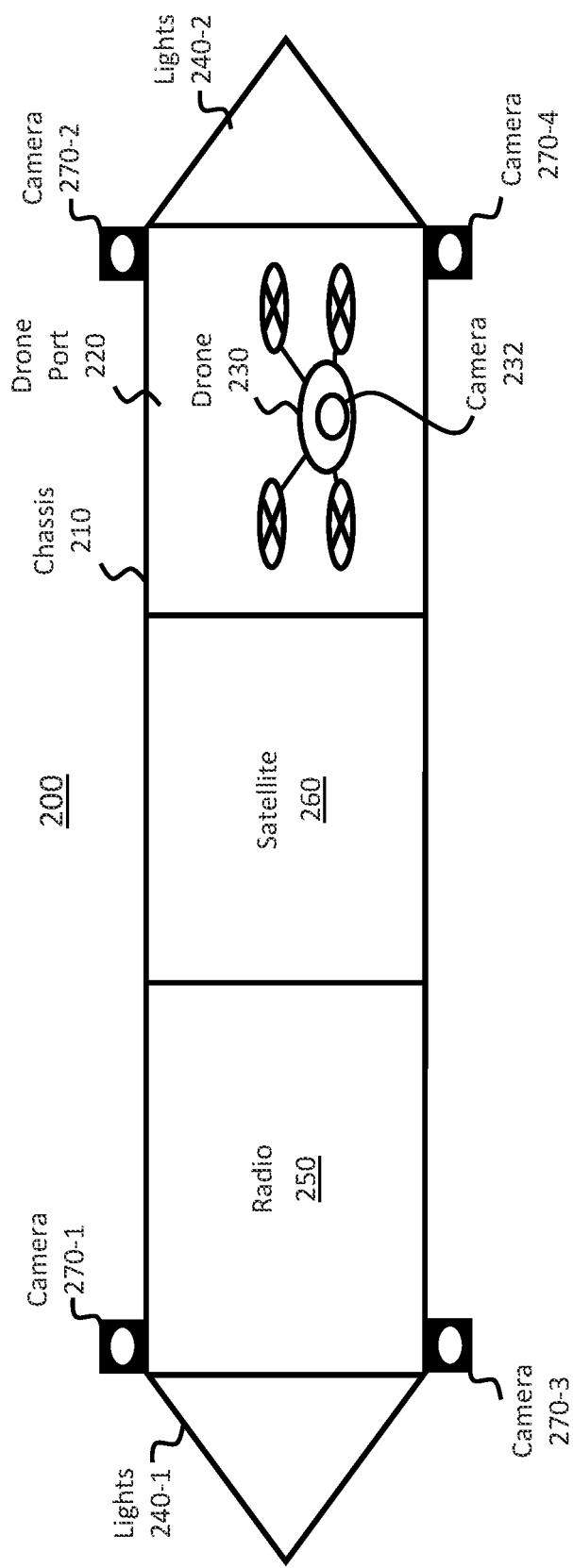
FIG. 2 is a front view of an embodiment of a light bar that has a chassis for receiving equipment according to various aspects of the present disclosure.

FIG. 2 is a front view of an embodiment of a light bar that has a chassis for receiving equipment according to various aspects of the present disclosure. Device 200 is a light bar. Device 200 includes a chassis 210, a drone port 220, lights 240, one or more radios 250, satellite equipment 260, and integrated cameras 270. In the embodiment shown in FIG. 2, drone 230 is also positioned within drone port 220. Drone 230 further includes a camera 232. By including these components in the chassis 210, wiring does not need to be installed for these components at other possible locations of installation within a vehicle.

A chassis may include: lights, a drone port (e.g., garage, container, storage area), one or more radios, one or more radios antenna, one or more cameras, a storage system, a siren, a rumbler, satellite equipment, a communications controller, one or more computers, temperature control, radar/lidar, and/or a license plate detector, a power supply, and/or power conditioning. For example, chassis 210 includes lights 240, drone port 230, radios 250, satellite equipment 260, and cameras 270. Chassis 210 also includes an external housing to protect one or more of these components.

A chassis may fit on the top of a vehicle. A chassis may couple to the top of a vehicle. A chassis may include one or more bays for positioning equipment. A chassis may include one or more busses (e.g., power, data, address) for providing power to and communication between bays. Bays may be of one or more standardized sizes. Bays may include couplers. Couplers may include couplers of standardized sizes and/or connections. Bays may include mounts. Mounts may be of standardized sizes and methods for mounting.

A chassis may be mounted on a vehicle in various manners. In embodiments, a chassis may be bolted onto a vehicle. A chassis may be configured to be securely fastened to a vehicle via bolts, screws, or other rigid fasteners. A chassis may be configured to be mounted permanently to a vehicle. A chassis may be configured to mounted to a vehicle and retained on a vehicle while the vehicle is in motion. A chassis may be retained on a vehicle as a vehicle travels at high speeds (e.g., greater than 100 miles per hour). A chassis may be configured to be mounted in a non-removable manner on a vehicle.

A chassis may include one or more covers, lids, doors, and or windows. Covers may be removed for installation and/or maintenance. Lids may be lifted to remove equipment (e.g., drone) and closed to stow equipment. Windows may permit the passage of light from an exterior of the chassis to an interior of the chassis. Cameras may be positioned proximate to windows to capture images of objects and events around the chassis.

For example, chassis 210 may include an access physically coupled to drone port 220. The access may be motorized. The motorized access may comprise one or more panels, lids, or doors, each connected to one or more motors or other actuators that may control a position of the access. The motorized access may open and close in response to signals. The signals may selectively activate the motorized access. The access may open upon receipt of a first signal. When an access is open, drone 230 may enter and exit port 220. The access may receive a second signal to close. When the access is closed, drone 230 may be protected from wind, rain, snow, and other environmental conditions which may be encountered by chassis 210 or to which chassis 201 may be exposed. A motorized access, such as a motorized lid, motorized door, motorized panel, or other access may enable a drone to launch from chassis 210 automatically and without manual intervention to prepare the chassis 210, drone, 230, or drone port 220 for launch. For example, a drone, user interface device, or other device may transmit a signal to the motorized access when a drone is configured (e.g., is instructed, has received a signal, has activated fans, is being operated in an aerial mode, etc.) to launch. A motorized lid, door, or other access may enable a drone to land in the drone port 220 in chassis 210 automatically and without manual intervention to prepare the chassis 210 or drone port 220 to receive the drone 230. One or more signals to control the motorized lid, door, or access may be received from a user interface device disposed inside a vehicle. The user interface device may be in wireless communication with the chassis 210 to provide the one or more signals.

Chassis 210 includes at least one window. The window may be disposed adjacent drone port 220. The window may form one wall of drone port 220. The window may comprise at least one clear or at least partially transparent material. For example, a window may comprise a clear, plastic material. In embodiments, a window may alternately or additionally comprise a clear or at least partially clear glass material. The window may be configured to permit signals to pass therethrough. The signals may pass from an exterior of the chassis to an interior of the chassis via the window. For example, light from external environment may pass through the window and be received by camera 232 of drone 230. The window may provide a physical barrier but not an optical barrier from an external environment for the drone port 220. One or more other portions of chassis 210 may include one or more windows as well. Alternately, in other embodiments, other portions of chassis 210 may be enclosed by solid, opaque portions of an external housing. In embodiments, an external housing of chassis 210 may include window and non-window portions.

The chassis may be positioned on any part of a vehicle. In an implementation, the chassis is mounted to the roof of a vehicle. The chassis occupies all or a portion of where a light bar would have been mounted. A chassis may mount to a vehicle roof in any way. For example, chassis 210 may be bolted onto a roof of a vehicle. Chassis 210 may also be mounted such that drone port 220 is disposed on a first end of the chassis 210 proximate a passenger side of a vehicle. In other embodiments, chassis 210 may be mounted to a vehicle such that a second end of the chassis 210 with a drone port 220 may be proximate a driver side of a vehicle.

Lights may be positioned on any part of the chassis. Lights may be positioned on an exterior of the chassis. The lights on the chassis may include lights typical of security vehicles. Electronics for controlling the lights may be positioned inside the chassis. The wiring for the lights may be positioned in the chassis.

Light bar 200 includes lights 240. Lights 240 may be signal lights, operable to indicate a predetermined warning or other signal in an area when activated. Lights 240 include a first set of lights 240-1 and a second set of lights 240-2. Lights 240-1 may be a different color than lights 240-2. Lights 240-1 may be controlled separately from lights 240-2, including to be turned on at different and/or alternating times. Lights 240 may wrap around an external housing of chassis 210. In embodiments, lights 240 may be provided at and/or around a periphery of chassis except for one or more locations at which a window is included in the chassis. Lights 240 may be provided around, but not over a window, to prevent the lights 240 from obscuring a view of a camera capturing image data from inside the chassis via the window. For example, a window of drone port 220 may be surrounded, but not covered by lights 240-2 to enable a camera of the drone to capture images of objects outside of the chassis 210. Lights 240 may be selectively placed adjacent, but not over, other parts of chassis 210, including locations at which cameras 270 are disposed.

In embodiments, a device 200 configured to be mounted in a vehicle may not include external lights. For example, a device 200 may include chassis 210 and other components shown in FIG. 2, such as drone port 220, but not lights such as lights 240. In such embodiments, an exterior surface of device 200 may include an external housing of chassis 210. Device 200 may alternately or additionally include one or more windows as part of an external surface of the device 200. In alternate embodiments, signal lights may be provided in a different device, separate from device 200. Device 200 may also be mounted on different locations on a vehicle. For example, device 200 may be mounted on a trunk of a vehicle, proximate a rear of a vehicle, or proximate a front of a vehicle. Each such position may be different from a position at which a light bar may be installed or mounted.

A drone port includes an enclosure for housing a drone. A drone port includes a door or an access for removing and/or inserting the drone. An officer may remove and/or insert the drone into the drone port. A drone port may include power to recharge the batteries of the drone while positioned in the port. A drone port may include a data connector to permit access to data stored on a server. A drone port protects the drone from adverse elements. A drone port may be opened to receive a drone and to extract the drone. A drone port may be closed to protect the drone. While a drone is positioned in the drone port, a camera of the drone may capture images of objects outside of the chassis.

For example, drone port 220 includes an enclosure for housing drone 230. Drone port 220 includes a door. The door may be selectively positioned (e.g., opened, closed, rotated, slid) to enable physical removal and/or insertion of drone 230. An officer may remove and/or insert drone 230 into the drone port 220. In other embodiments, the door or other manner of access to drone port 230 may be motorized, enabling a drone 230 to enter and exit drone port 220 under its own power and without manual input from a user. The door may be selectively positioned (e.g., opened, closed, rotated, slid) to enable physically removing and/or inserting drone 230 into drone port 220. Drone port 220 includes power to recharge the batteries of the drone while positioned in the port. In embodiments, the power may be transferred to the drone 230 wirelessly by the drone port 220 via wireless power transmission. Drone port 220 includes a data connector to permit access to data stored on a server. The data connector may include one or more of a wired or wireless communication circuit in the drone port 220 configured to transmit and receive data from drone 230 while drone 230 is positioned within the drone port 220. For example, the data connector may be configured for communication with drone 230 in accordance with a wired protocol, a near-field communication protocol, and/or short-range protocol. In embodiments, a data connector in the drone port may communicate with drone 230 in accordance with one of a WIFI protocol and a universal serial bus (USB) protocol. The data connector may be integrated within the drone port, configured to communicate directly with drone 230 while drone 230 is within the drone port 220. The data connector may be configured to communicate with the drone 230 at distances of less than one inch, less than three inches, or less than six inches. The data connector may be separate from other communication equipment in the chassis 210, such as radios 250. In embodiments, the data connector does not include a long-range communication circuit. For example, the data connector may not include (e.g., exclude, not be, etc.) a circuit that operates in accordance with a cellular network protocol. Drone port 220 protects drone 230 from adverse elements. Drone port 220 may be opened to receive drone 230 and closed to protect the drone 230.

While drone 230 is positioned in the drone port 220, a camera of the drone may capture images of objects outside of the chassis 210. Drone port 220 includes window. The window forms a side of the enclosure of drone port 220. The window is disposed on an elongated side of chassis 210. The elongated side may be disposed facing a front or rear of a vehicle, rather than a passenger or driver side of a vehicle. Drone 230 may be positioned within drone port 220 such that camera 232 of drone 230 may be oriented toward the window of the drone port 220. The camera 232 may capture images through the window of the drone port 220. The images may be captured as image data by the camera 232 of the drone 230.

In embodiments, a drone port may be positioned at a first end of a chassis. The drone port may be asymmetrically positioned within the chassis. The drone port may not be positioned in a center of the chassis. The drone port may not be positioned away from a center of the chassis. The drone port may be positioned on a side of a chassis configured to be mounted on a passenger side of the vehicle. Based on such positioning, a drone may respond to events that occur on an opposite side of a vehicle from a driver of the vehicle. For example, a drone may be able to follow another vehicle or another target object attempting to flee the driver of the vehicle away from the driver side of the vehicle. A camera of the drone may be positioned to track (e.g., capture image data representing, adjust orientation upon detected movement of, etc.) a passenger of another vehicle from an end of the chassis. A camera of the drone may be positioned to track a person in another vehicle from an end of the chassis. A camera of the drone may be positioned at an end of a device to capture images of an object as it exists another vehicle. An object may include an object thrown from a window of the other vehicle. A camera of the drone may be positioned at an end of the device to read license plates of other vehicles being passed by the vehicle on which the chassis mounted. The other vehicles may include parked vehicles located proximate the end of a chassis in which a drone port is disposed, further away from a center of the chassis. An asymmetrically positioned drone port may enable a camera of a drone to capture a different angle of view of an event, aside from one that may be directly observed by an officer in a driver's seat of a vehicle and/or recorded by a body-worn camera of a driver of the vehicle.

Drone port 220 is positioned on a side of device 200. Drone port 220 is positioned at a first end of chassis 210, away from a center of the chassis 210. Drone port 220 is asymmetrically positioned within chassis 210. Upon mounting of chassis 210 to a vehicle, drone port 220 may be positioned on a side of a chassis proximate a passenger side of the vehicle. Drone port 220 enables camera 232 of drone 230 to capture images of objects on a first side of a vehicle and chassis 210. Such objects may include one or more of a passenger of another vehicle, a person in another vehicle, a license plate of another vehicle, a door of another vehicle, and an object exiting a side of another vehicle.

Radios includes any device that communicates (e.g., transmit, receive) electronically. A radio includes any radio used to communicate using any communication protocol.

Device 200 includes at least one radio 250. The at least one radio 250 may be capable of short-range communication with other component of the device 200 or a system that includes device 200. The at least one radio 250 may also be capable of long-range communication with a remote computing device. For example, at least one radio 250 may be capable of long-range communication with a remote computing device of a dispatcher. Information may be communicated from the remote computing device to the drone port 220 and drone 230 via the at least one radio 250. Communication using at least one radio 250 may include any conventional technologies (e.g., cellular phone service, text and data messaging, email, voice over IP, push-to-talk, video over cellular, video over IP, and/or the like). Communication may use conventional public or private media (e.g., public cellular phone service, local area service, reserved channels, private trunk service, emergency services radio bands, and/or the like).

Antennas may be mounted on an exterior the chassis. An antenna may be mounted on an extendable boom (e.g., mast). A boom may extend from the chassis. A boom may position the antenna. A boom may position an antenna to better provide line of sight transmission and/or reception. A boom may automatically deploy or at the initiation of a user. An antenna may be physically positioned proximate to a radio. An antenna may be positioned proximate to the radio that receives signals from the antenna to reduce attenuation of the signal between the antenna and the radio. For example, an antenna for 5G may be positioned close to the radio for 5G to minimize signal loss between the antenna and the radio. Radio 250 may include at least one antenna.

Satellite equipment includes any equipment for communicating with a satellite. A satellite may be positioned in any orbit. A satellite may be used for transmitting and/or receiving data of any type. Satellite equipment may include, as discussed above, radios and/or antenna. Satellite equipment may provide wide-area (e.g., state-wide, region-wide) communication capabilities. For example, a satellite system could communicate using the Iridium satellite network. Satellite equipment may cooperate with and/or communicate via the First Nav emergency communication network. Device 200 includes satellite equipment 260.

Cameras (e.g., capture devices, captures systems, recording devices, recording systems) may be positioned on an exterior of the chassis or inside the chassis with access to light from an exterior of the chassis to capture images. A camera may be positioned in the chassis and a lens of the camera positioned in the cabin of the vehicle. Data from the lens may be carried to the camera via a wired or wireless connection. Cameras may be positioned for capturing images exterior to the chassis toward any direction with respect to the chassis and/or the vehicle. Cameras may store captured data locally. Cameras may provide captured data to a storage unit (e.g., digital video recorder). Cameras may provide captured data to a server (e.g., computer, edge computer).

Device 200 includes cameras 270. Cameras 270 include cameras 270-1, 270-2, 270-3, and 270-4. Cameras 270 may be fixed to chassis 210. Cameras 270 may be oriented in different directions. Each camera 270 may capture separate image data. Each camera 270 may capture image data separate from image data captured by camera 232 on drone 230. Cameras 270 may be configured to capture one or more of a front passenger side of a vehicle to which chassis 210 is mounted, a rear passenger side of a vehicle to which chassis 210 is mounted, a front driver side of a vehicle to which chassis 210 is mounted, and a rear driver side of a vehicle to which chassis 210 is mounted.

Figure 3:
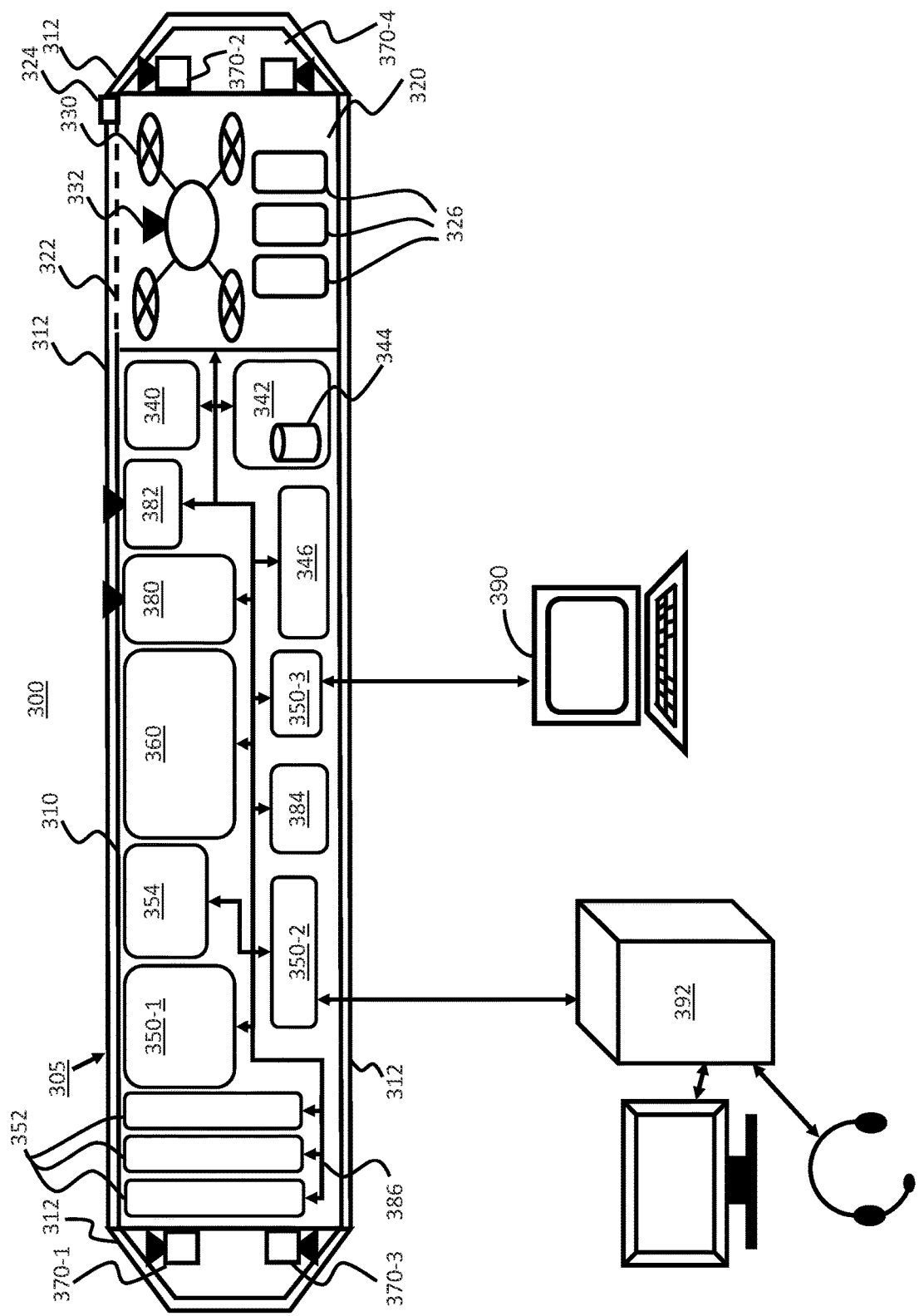
FIG. 3 is diagram of a system comprising a device with a chassis according to various aspects of the present disclosure.

Embodiments according to various aspects of the present disclosure include a system for providing security functions to a vehicle. FIG. 3 is diagram of a system comprising a device with a chassis according to various aspects of the present disclosure. System 300 includes a device 305 configured to be mounted on a vehicle, a drone 330, a user interface device 390 configured to be mounted inside a vehicle, and a remote computing device 392.

Device 305 is configured to be mounted to a vehicle, such as vehicle 105. Device 305 may be mounted to a roof of a passenger compartment of a vehicle. Device 305 may have an elongated shape as shown in FIG. 3. Device 305 may include a chassis 310, drone port 320, radios 350, satellite communication equipment 360, cameras 370, and other components.

Chassis 310 may include a structural framework to which other components are attached. Chassis 310 may include one or more bays, each bay configured to receive a piece of equipment. Chassis 310 may also include an exterior housing. The exterior housing may protect bays, equipment, and other devices from external environmental conditions. Chassis 310 includes busses 386 (e.g., power, data, address) for providing power to and communication between bays. Busses 386 in chassis 310 may also interconnect other components shown in FIG. 3, aside from those disposed in bays. Busses 386 in chassis 310 may interconnect other components of device 305 independent of whether the other components are disposed in a bay of chassis 310. By placing such components in a chassis configured to be mounted externally to a vehicle, security functions of such components may be provided to the vehicle, but a need for installing the components and any related wiring within the vehicle may be avoided.

In embodiments, device 305 may be light bar. Device may include lights 312 on one or more sides of chassis 310. Lights 312 may be positioned at and/or around a periphery of chassis 310. Lights 312 may be positioned around portions of device 305, such as a window 322, or order to not obstruct an angle of view of other components such as camera 332. Portions of lights 312 may be different colors and selectively activated in one or more different manners in order. For example, a first portion of lights 312 may be turned on and off during a time period while a second portion of lights 314 may be turned off and on during the same time period. Different colors and manners of activation of lights may provide one or more visual indicators in an area in which device 305 is disposed. The visual indicators may correspond to a warning or instruction and may further identify the vehicle on which device 305 is mounted as a security vehicle. In other embodiments of device 305, lights 312 may not be included.

Device 305 includes a drone port 320. Drone port 320 includes an enclosure in which a drone 330 may be positioned. Drone port 320 includes an access through which drone 330 may be launched from chassis 310 and received into chassis 310 after flight. The access may include a lid, door, or panel. Drone port 320 may be sized and shaped to fully enclose drone 330. Drone port 320 may also provide drone 330 with sufficient clearance to autonomously enter and exit without contacting chassis 310 or another component of device 305.

Drone port 320 includes a window 322. Window enables camera 332 to capture images while positioned in drone port 320. Window 322 provides a physical barrier to protect drone 330 from wind and other external conditions, while still enabling light to be received by a lens of camera 332 in order to capture images of objects external to device 305.

Because window 322 is disposed in contact with an environment external to device 305, window 332 may be covered or partially covered by materials from the external environment. Such coverage may negatively impact or otherwise preclude images from being captured of objects external to device 305. Drone port 320 may include one or more devices to address such materials and prevent them from covering or partially covering window 322. Such devices may be employed to ensure that camera 332 may continue to capture images of objects or events external to device 305, even in adverse conditions.

In embodiments, drone port 320 may include a water removal device 324. Water removal device 324 may be positioned adjacent window 322. Water removal device 324 may be integrated with chassis 310. Water removal device 324 may be configured to apply a force to an external surface of window 322. The force may clean the window 322. For example, water removal device 324 may remove rain, snow, mist, fog and other liquids from an external surface of the window 322 adjacent the device 324. In embodiments, a force applied by water removal device 324 may also be enough to remove other material from window. For example, water removal 324 device may apply a force sufficient to remove dirt, dust, or other particulates from window 322. Water removal device 324 may ensure that window 322 is clear so that camera 332 may reliably capture images and image data of objects outside device 305, even in rainy, dusty, or otherwise adverse environmental conditions.

In embodiments, water removal device 324 may include one or more mechanical wipers. Each wiper may apply a physical contact force across an external surface of the window 332 to remove rain, dust, and other material from the surface of the window 322. Each wiper may pivot across the external surface of the window. Each wiper may include an arm, rotatably mounted to chassis 310 or drone port 320 at a first end and a blade at a second end. The arm may be rotated by a motor of the device 324 about a pivot point at the first end, causing the blade at the second end to travel across the surface of the window 322, thereby pushing, wiping, or otherwise clearing material from the window 322.

In embodiments, water removal device 324 may include a vent. The vent may be in physical communication with an enclosure of drone port 320. The vent may be configured to direct air from the enclosure across a surface of the window. Air from the vent may provide a force sufficient to remove material from the surface. In embodiments, air may be provided through the vent by activating one or more fans of the drone. The activated fan may draw air from a second vent and push the air through the vent of device 324 adjacent the window. The drone port 320 may include one or more guides to direct the air from fans of a drone through the vent and/or along an external surface of the window. The guides may include one or more physical surfaces to receive and direct air from a first location toward a second location, such as from a fan of a drone toward a vent or from a vent and along an external surface of the window. The vent may be narrow, preventing rain and other external materials from entering the drone port. A guide may also be positioned adjacent the vent to both guide air from the vent along the surface and prevent material from a direction perpendicular to the surface from entering the vent. In embodiments, a vent or a combination of a vent and a guide may comprise one or more angled or rounded surfaces to protect the vent from receiving external materials and/or guide air along the external surface of the window.

In other embodiments, water removal device 324 may include a fan, blower or other source of air to provide a force across an external surface of the window. The fan, blower, or other source of air may be provided internally or externally to drone port 320. The fan, blower, or other source of air may or may not include one or more vents configured to direct the air across the surface. The source of air may provide air directly across the surface. The fan, blower, or other source of air may or may not include one or more guides configured to direct the air across the surface.

In embodiments, water removal device 324 may include alternate or additional components, including one or more guides to direct air across a window and/or provide a recessed area in which the window is disposed and protected by the one or more guides. These embodiments may or may not include an active source of air, such as a blower or fan.

Drone port 320 may also include one or more payloads 326. Drone 320 may selectively attach at least one of the payloads 326 prior to launch and while drone 320 is still positioned in drone port 320. A plurality of the payloads may include two or more of a camera, an infrared camera, radio communication equipment, a spotlight, and rescue equipment. Rescue equipment may include one or more of a portable communication device, a flashlight, rope, a mask, a flare, and/or other equipment configured to provide aid during an event. The payloads 326 may be provided on a rotatable surface. For example, the payloads 326 may be attached to a turntable, cylinder, conveyor belt, or other rotatable device in drone port 320 which may be adjusted (e.g., rotated, moved, reconfigured) to position a payload among the plurality of payloads adjacent a drone prior to launch. A drone may attach to a payload upon positioning of the payload in a predetermined position. For example, a drone may include a mechanical and/or magnetic mount, configured to attach to a payload upon positioning of the payload to a given location proximate the mount. Adjustment of positions of the plurality of payloads 326 may be selectively controlled by one or more of the drone port 320 and drone 330. For example, drone 330 may receive flight data and select a payload among the plurality of payloads 326 prior to launch. The flight data may include indicia of a single payload to select prior to launch. The flight data may include indicia of a payload to select among the plurality of payloads 326 prior to launch. For example, the flight data may indicate a selection of an infrared camera. In other embodiments, drone 330 may detect an environmental condition and select a payload based on the detected environmental condition. For example, drone 330 may be configured to detect a lack of ambient light in an environment and select a payload comprising a spotlight prior to launch. In another example, a drone 330 may detect a low signal strength of a communication network in an area and select additional radio communication equipment. Other types of payloads and manners of selecting a payload may be employed in embodiments according to various aspects of the present disclosure as well. In embodiments, a drone may selectively attach or not attach to a single payload prior to launch, including in accordance with received flight data.

System 300 may include a drone 330. Drone 330 may be configured to perform one or more tasks autonomously. Drone 330 may perform tasks autonomously in response to detected conditions. For example, drone 330 may include one or more sensors, including camera 332, and perform tasks in response to output data detected or generated by the sensors. Drone 330 may also be configured to perform tasks autonomously in response to information received from chassis 310. For example, flight data may be received by the drone 330 via the chassis 310. In response to the flight data, the drone may be configured to launch automatically from drone port 320. Drone 330 may also position itself at a location in response to received flight data. Drone 330 may also orient camera 332 in a direction based on received flight data. Drone 330 may further track an object in response to flight data, wherein tracking the object may include optical tracking and/or positional tracking of the object. Optical tracking may include adjusting an orientation of camera 332 to maintain an object with an angle of view of the camera 332. Positional tracking may include adjusting a physical position of the drone 330. Positional tracking may include controlling fans of the drone 330 to cause the drone 330 to maintain a predetermined distance between the target and the drone 330. Such tasks may include launching of the drone 330 from the drone port 320. Such tasks may be performed automatically upon receipt of the flight data by the drone. Such tasks may be performed independent of further external inputs transmitted to the drone. Such tasks may be performed independent of further additional inputs to the drone from a user interface device, a computing device in a chassis, or a remote computing device. After launch, such tasks may be performed based on data received by sensors of the drone, including an image sensor of camera 332. After launch, such tasks may be performed based on data processed and/or generated by the drone, including image data from a camera of the drone that may be further processed by a processing circuit of the drone.

Other sensors (e.g., IR, vibration, heat, moisture) may be positioned on an exterior of the chassis and/or in the chassis. Sensors may detect physical properties. Sensors may provide data relative to detecting physical properties. For example, chassis 310 includes one or more heat, vibration, temperature, and moisture sensors 384.

A storage system (e.g., digital video recorder, memory, database) may be positioned in the chassis. A storage system may receive data from any device for storage. A storage system may receive captured images and/or audio from cameras. A storage system may receive detected data from any sensor. A storage system may store data provide by an officer, a body camera, a CEW, a remote server, and/or dispatch. A storage system may receive and provide data to a server. A storage system may include any type of memory and store data in any format (e.g., database).

Device 305 includes storage system 342. Storage system 342 is included in chassis 310. Storage system 342 includes at least one of a digital video recorder, memory, and a database 344 positioned in chassis 310. Storage system 342 receives or transmits data to various components in device 305. Transmission of data to or from storage system 342 may be performed via one or more wired or wireless communication channels. The wired channels may include channels provided by bus 386.

For example, storage system 342 may receive image data from drone 330. Image data from drone 330 may include images captured by camera 332 and transmitted to storage system 342. The images may be captured as image data. Image data received by storage system may include images of objects captured by camera 332. The image data may include event data. Event data may be received and stored from drone 330 for one or more events. The image data from drone 330 may be transferred while the drone is positioned in drone port 320. For example, drone 330 may offload image data of an event upon returning to drone port 320 after recording the image data during the event. Drone 330 may offload image data and other data recorded during a flight of the drone via a wired or wireless channel provided to storage system 342 via bus 386 or a short-range communication circuit 350-3. The offloaded data may include data recorded during a flight of a drone and data recorded before launch of the drone to begin the flight. Data may also be received from drone 330 while the drone 330 external to drone port 320, such as via a short-range radio communication circuit 350-3 or a long-range radio communication circuit 350-2.

In embodiments, storage system 342 may also receive captured image data, audio data, and/or other input data from cameras 370, one or more sensors 384, and a user interface device 390. Storage system 342 may also receive and transmit data to a remote computing device 392. Remote computing device 392 may be in communication with storage system 342 via a long-range radio communication circuit 350-2. Remote computing device 392 may include a server to which data from storage system 342 is request or received upon request to the server. In embodiments, data from a drone 330 may be stored in a database 344. The data may include image data from the drone. In embodiments, the data may include event data from the drone. Upon request, data from the database 344 may be transmitted to one or more of remote computing device 392 and user interface device 390.

Satellite equipment includes any equipment for communicating with a satellite. A satellite may be positioned in any orbit. A satellite may be used for transmitting and/or receiving data of any type. Satellite equipment may include, as discussed above, radios and/or antenna. Satellite equipment may provide wide-area (e.g., state-wide, region-wide) communication capabilities. For example, a satellite system could communicate using the Iridium satellite network. Satellite equipment may cooperate with and/or communicate via the First Nav emergency communication network.

Device 305 includes satellite equipment 360. Satellite equipment 360 may be included in one or more bays of chassis 310. In embodiments, satellite equipment includes a global positioning system (GPS) receiver. The GPS receiver may detect a position of the device 305. The GPS receiver may be separate from a GPS receiver disposed in drone 330.

A communications controller includes any devices for controlling and/or coordinating the communication equipment of the chassis. A communications controller may monitor available signals via all antennas of the chassis. A communications controller may select one or more methods (e.g., 5G, 4G, 3G, WiFi, satellite) for communication. A communications controller may communicate using one or more methods at the same time or in serial. A communications controller may select a method in accordance with the priority of the data, the amount of the data, and the cost of communication. Device 305 includes communications controller 354. Communications controller 354 may be included in one or more bays of chassis 310. In embodiments, communications controller 354 may control and/or coordinate transfer of signals, data, information, indicia, and combinations thereof among radios 350, antennas 352, satellite equipment 360, and other components of device 305.

A computer includes any type of computing device and/or processing circuit. A computer includes any device that executes one or more stored programs, stores information and/or retrieves stored information, performs a calculation, and/or alters data. A computer may be referred to as and perform the functions of a server, an edge device, an edge processor, and/or a mobile data terminal. A computer may include a microprocessor, memory, busses, IO ports, and any other component. A computer may perform calculations and/or communicate data for the benefit of any other component of the chassis. A computer may present information to a user via a display. A computer may cooperate with and/or perform some or all of the functions of a communications controller. A computer may receive data from a human user. A computer may communicate with a user interface (e.g., display, keyboard) positioned in a cabin of the vehicle. A computer may communicate with a user interface via a wired and/or a wireless connection. A computer may control and/or coordinate the operation of other equipment in the chassis. A computer may receive information via any radio. A computer may provide data to any radio for transmission. A computer may be implemented using a standardized form factor (e.g., rack mount).

Device 305 includes computing device 340. Computing device 340 may be disposed in a bay of chassis 310. Computing device 340 includes at least one processing circuit. Computing device 340 may be configured to execute one or more stored programs. Computing device 340 may be configured to execute computer readable instructions that, in response to execution by the processing circuit, cause the computer 340 and/or device 305 to perform one or more functions discussed herein. In embodiments, computer readable programs or instructions may be stored in storage system 342. Computer 340 may also be configured to store information and/or retrieve stored information, perform a calculation, and/or alter data. Information and data associated with such processing, including the outputs of such processing, may be stored on storage system 342. Computing device 340 may be referred to as and perform the functions of a server, an edge device, an edge processor, and/or a mobile data terminal.

In embodiments, computing device 340 may perform calculations and/or communicate data for other components of chassis 310. For example, computer 340 may receive indicia of one or more objects in image data captured by drone 330. For example, the indicia may include indicia of objects corresponding to a vehicle and a person in the captured image data. The indicia of the objects may include indicia of objects detected in the image data by the drone.

In other embodiments, a computing device may receive image data captured by a camera, detect one or more objects in the captured image data and generate indicia of the one or more objects detected in the module. For example, a processing circuit may execute an object detector module on captured image data from the camera of the drone to generate indicia of the one or more objects. An object detector module may be stored in a storage system in a chassis with the computing device. Upon execution of instructions of the objection detection module, a processing circuit may receive image data and generate indicia of one or more objects detected in the image data. An object tracking module may be stored in a storage system. For example, the indicia may include indicia corresponding to one or more of a vehicle and a person in the captured image data.

Indicia of a detected object may be provided to another device from the device configured to be mounted on a vehicle. Indicia of a detected object may include one or more values, identifiers, indicators, or other data associated with an object represented in captured image data. In embodiments, indicia of a detected object from a drone may be provided to a user interface in a vehicle via a chassis. For example, indicia may be provided by the computing device 340 to a user interface device 390. The indicia may be provided for a display of the user interface device 390. The user interface device 390 may be positioned in a cabin of a vehicle. The indicia may be provided via a short-range radio communication circuit 350-3. In embodiments, indicia of one or more detected objects may also be provided to remote computing device 392.

After providing the indicia to a user interface device, a computing device may receive indicia of one or more of objects. The indicia of one or more of objects may include indicia of one or more of the detected objects. The indicia of one or more of objects may include indicia of one or more objects to be tracked. One or more of the objects to be tracked may correspond to one or more of the detected objects. For example, computing device 340 may receive indicia corresponding to selection of the one or more objects via the interface device 390. The indicia may correspond to a user input provided by one or more of a keyboard or display of the interface device 390. For example, the indicia may correspond to a vehicle in the captured image. The indicia may be received via a short-range radio communication circuit 350-3.

A computing device may provide indicia of one or more objects to be tracked to a drone. For example, computing device 340 may provide indicia associated with the selection to the drone 330. The indicia may be included in flight data provided to the drone 330 prior to launch of drone 330 from drone port 320. In embodiments, computing device 340 may provide other indicia in flight data, including indicia for one or more of target object data, a relative position, and a motion response for the drone 330.

In another example, a computing device may provide indicia of one or more objects in image data captured by a drone to a remote computing device. The indicia may include indicia of one or more detected objects. The indicia of one or more objects may be generated by a drone or generated by the computing device based on captured image data from the drone. For example, indicia may be provided for a display of the remote computing device 392. The remote computing device 392 may be provided at a location (e.g., building, office, etc.) of an agency associated with vehicle on which device 305 is mounted. The indicia may be provided via a long-range radio communication circuit 350-2.

After providing the indicia to a remote computing device, a computing device may receive indicia of one or more of the objects. The indicia of one or more of objects may include indicia of one or more of the detected objects. The indicia of one or more of objects may include indicia of one or more objects to be tracked. One or more of the objects to be tracked may correspond to one or more of the detected objects. For example, received indicia may correspond to a selection of the one or more objects via the remote computing device 392. The indicia may correspond to a user input provided by one or more of a keyboard or display of the remote computing device 392. For example, the indicia may correspond to a vehicle in the captured image. The indicia may be received via a long-range radio communication circuit 350-2.

Computing device 340 may provide the indicia associated with the selection from the remote computing device to the drone 330. The indicia may be included in flight data provided to the drone 330 prior to launch of drone 330 from drone port 320. In embodiments, computing device 340 may provide other indicia in flight data, including indicia for one or more of target object data, a relative position, and a motion response for the drone 330. In embodiments, flight data provided to a drone may include a combination of indicia received from both a user interface device 390 and a remote computing device 392.

In embodiments, other indicia included in flight data may be received from another computing device as well. For example, a relative position and a motion response for the drone may also be received from a remote computing device or a user interface device. The other indicia may also be generated, provided, and received based on an input received at a remote computing device or a user interface device.

In embodiments, information (e.g., data, indicia, flight data, etc.) may be transmitted and received between the remote computing device 392, user interface device 390, and drone 330, independent of a computing device 340 in chassis 310. Information generated by one or more of devices 390,392 may be received from a radio 350 by drone 330, independent of whether the information is further processed or otherwise received by computing device 340. The drone 330 may receive information via chassis 310 independent of whether the information is received by computing device 340. In embodiments, the drone 330 includes a processing circuit and communication circuit by which information may be transmitted and received from other components or devices in system 300, including devices 390,392 and components of device 305.

Temperature control includes any device suitable for controlling temperature and/or humidity. Temperature control may be suited to controlling the temperature of the atmosphere in an enclosed area, such as inside the chassis. Temperature control may increase, decrease, and/or maintain the temperature and/or humidity of the atmosphere in the chassis. Temperature control may be accomplished by moving (e.g., fans), heating, and/or cooling air. Temperature control may be accomplished by altering the moisture (e.g., humidity in the air). In embodiments, sensors 384 may include sensors for both detecting temperature or moisture and one or more control devices (e.g., fans, dehumidifiers, etc.) for adjusting a temperature or moisture of the chassis 310. Such components of sensors 384 may be controlled and/or coordinated at least in part by computing device 340.

Radar/lidar includes any type of radar and/or lidar equipment for detecting the presence and/or speed of objects outside of the chassis. Radar/lidar includes any type of emitter that emits radar, laser light, and/or infrared light. Radar/lidar includes any type of detector that detects reflected radar, laser, and/or infrared light. Radar/lidar includes any type of control circuitry and/or human interface for directing light toward a specific object (e.g., vehicle). Control circuitry may automatically identify and report the speed of objects such as vehicles. Control circuitry may present the detected speeds of the targeted vehicles. Device 305 includes radar/lidar unit 380. Radar/lidar unit 380 may be included in chassis 310. Radar/lidar unit 380 may identify a speed of an object external to device 305. The identified speed may be provided to another device, including remote computing device 392 or user interface device 390. The identified speed may also be provided to storage system 342 for storage.

A license plate detector includes any device suited to detecting the information on a license plate. A license plate detector may cooperate with any camera, storage, lidar device, and/or computer to detect a license plate and to determine the information on the license plate. Device 305 includes license plate reader 382. License plate reader 382 may be included in chassis 310. License plate reader 382 may detect image data comprising a license plate, recognize one or more characters in the image data for the license plate, and provide indicia of the recognized characters in output data from the license plate reader 382 to one or more other components of device 305. In other embodiments, license plate reader 382 may detect image data comprising a license plate and provide corresponding image data to computing device 340 for subsequent processing. Computing device 340 may then perform optical character recognition on the data detected by license plate reader 382 and generate indicia of one or more characters recognized in the detected license plate data. Indicia of recognized characters from a license plate may be provided to other components of device 305, including drone 330 and/or storage system 340.

A power supply includes any source of power. A source of power may include batteries. Batteries may be positioned in the chassis. Batteries may provide some or all of the power used by the equipment in and/or on the chassis. Power from the vehicle may be used to recharge the batteries in the chassis and/or to provide power to some or all of the equipment in the chassis.

Power conditioning includes any circuitry suitable for altering the electrical characteristics of electrical power to meet the conditions needed by the equipment that uses the power. Power conditioning may change any characteristic (e.g., voltage, current, slew rate, ripple, spikes) of electrical power. Power conditioning may receive electrical power from any source (e.g., battery, line, alternator). Power conditioning may provide power having any electrical characteristics. Power conditioning may provide AC current and/or DC current at any voltage suitable for the equipment in the chassis. Device 305 includes a power supply and power conditioning circuitry 346. Circuitry 346 may be disposed in one or more bays of chassis 310. Circuitry 346 may be connected to one or more components of device 305, including via busses 386.

Radios may include one or more communication circuits. The one or more communication circuits may include one or more radio communication circuits. For example, Radios 350 include a first radio communication circuit 350-1, a second radio communication circuit 350-2, and a third radio communication circuit 350-3. Each radio communication circuit may communicate via one or more antennas. For example, one or more radio communication circuits of radios 350 may communication via one or more antennas 352.

In embodiments, a first radio communication circuit 350-1 may include a short-range radio communication circuit. A short-range radio communication circuit may transmit and receive data over short ranges (e.g., less than one hundred feet, less than thirty feet, less than ten feet, less than one foot, etc.). In embodiments, first radio communication circuit 350-1 may operate in accordance with a BLUETOOTH protocol. One or more components of system 300 may be in communication with device 305 via the first radio communication circuit 350-1. For example, one or more of user interface device 390 and drone 330 may be in communication with device 305 via first radio communication circuit 350-1.

In embodiments, a second radio communication circuit 350-2 may include a long-range radio communication circuit. The long-range radio communication circuit may transmit and receive data over long ranges (e.g., greater than one hundred feet, greater than one thousand feet, greater than one mile, greater than ten miles, etc.). In embodiments, second radio communication circuit 350-2 may operate in accordance with a cellular protocol (e.g., LTE). In embodiments, second radio communication circuit 350-2 may communicate with a cellular network. One or more components of system 300 may be in communication with device 305 via the second radio communication circuit 350-2, including a remote computing device 392.

In embodiments, a third radio communication circuit 350-3 may include a short-range radio communication circuit. The short-range radio communication circuit may be different from the first short-range communication circuit 350-1. In embodiments, third radio communication circuit 350-3 may operate in accordance with a WIFI protocol. In embodiments, third radio communication circuit 350-3 may form a wireless local area network. One or more components of system 300 may be in communication with device 305 via the third radio communication circuit 350-3, including one or more of a user interface device 390 and drone 330. Certain devices in system 300 may be in communication with device 305 via multiple radios 350. For example, a user interface device 390 may be in communication with device 305 via both first radio communication circuit 350-1 and third radio communication circuit 350-3.

In other embodiments, radio 350 may include one or more additional radio communication circuits, one or more fewer radio communication circuits, different combinations of long-range and short-range radio communication circuits, and/or different communication circuits that operate according to one or more different, additional, or alternate protocols. In other embodiments, one or more of communication circuits 350 may operate in a non-radio wireless medium, such as light, sound, or vibration.

In embodiments, device 305 may alternately or additionally include one or more communication circuits configured to communicate via a wired (e.g., electrical or optical) medium. Each such communication circuit may communicate using one or more wired (e.g., USB, RS-232, Firewire, Ethernet) communication protocols. Such an alternate communication circuit may also be in communication with one or more devices in the system via a wired communication protocol and/or wired medium. For example, a wired communication circuit may be in communication with a user interface device 305 via a USB protocol and/or a USB cable, instead of or in addition to a WIFI communication protocol. In embodiments, a wired communication circuit of device 305 may be included with and/or in communication with a data connector in drone port 320.

A device configured to be mounted on a vehicle may further include one or more integrated cameras. The integrated cameras may be attached to an internal or external portion of a chassis of the device. The integrated cameras may capture image data from a fixed angle of view on a vehicle.

Device 305 also includes cameras 370. Cameras 370 include a first camera 370-1, second camera 370-2, third camera 370-3, and fourth camera 370-4. Cameras 370 may be fixed to chassis 310. Cameras 370 may be oriented in different directions and may capture separate image data. For example, first camera 370-1 may capture image data in a direction of a front driver side of a vehicle to which chassis 310 is mounted, second camera 370-2 may capture image data in a direction of a front passenger side of the vehicle, third camera 370-3 may capture image data in a direction of a rear driver side of the vehicle, and fourth camera 370-4 may capture image data in a direction of a rear passenger side of the vehicle. Such cameras 370 may have a fixed orientation.

In other embodiments, device 305 may not include cameras 370. Instead, camera 332 may capture image data of events and objects in front of vehicle while positioned in drone port 320 and after drone 330 has launched from drone port 320. Such an arrangement may increase a utility of camera 332 as well as drone 330. Such embodiments may decrease the complexity and redundancy of providing similar, additional wiring and components inside chassis 310.

A system for providing security functions for a vehicle may further include devices in communication with device 305. Such devices may include one or more drones, one or more user interface devices, and one or more remote computing devices. For example, system 300 includes a drone 330, a user interface device 390, and remote computing device 392.

User interface device 390 may be positioned inside a cabin of a vehicle to which device 305 may be mounted. User interface device 390 may include a display. The display may be touchscreen device. User interface device 390 may also include one or more of a keyboard, mouse, or other user input device configured to receive input signals. The input signals may be received from a user. A user may include a driver of a vehicle to which device 305 is mounted. In embodiments, the user may be a law enforcement officer. In embodiments, user interface device 390 may include a mobile data terminal integrated with a vehicle on which device 305 is mounted.

In embodiments, a mobile data terminal is a special purpose computing device installed in a law enforcement vehicle. A mobile data terminal may be configured to display information and receive information related to a task to be performed using the vehicle. A mobile data terminal may be permanently or semi-permanently mounted to the vehicle. In embodiments, a mobile data terminal is different from a portable communication device. For example, a mobile data terminal may rely on additional components, such as one or more radios 350 or other elements of device 305 to communicate with a device remote from a vehicle in which the mobile data terminal is installed. A mobile data terminal may include a short-range radio communication circuit in order to communicate with device 305, but may not have a long-range communication circuit.

User interface device 390 may present information to a user. The information may include image data captured by a camera of device. The camera may include one or more of camera 332 and cameras 370. The information may include indicia of one or more objects detected in image data captured by a camera. For example, a display of user interface device 390 may illustrate a bounding box around an object detected in image data captured by camera 332. The bounding box data may be generated based on processing of the image data by one or more of drone 330 and computing device 340. The processing may include object detection and provide indicia of detected objects as output. For multiple objects detected, a bounding box may be generated for each of a plurality of objects detected in image data. For example, user interface device 390 may present indicia associated with each of a vehicle and a person detected in image data captured by drone 330. Other visual indications, aside from a bounding box may be employed to indicate a detected object and/or convey indicia of a detected object. Other indications may include one or more change to a color of a detected object at a user interface device or a color of areas of displayed image data that does not correspond to a detected object. The indicia, image data, and other data presented via a user interface device may be received via a short-range radio communication circuit. User interface device 390 may include a short-range radio communication circuit for communication with device 305.

User interface device 390 may also receive input from a user. The input may correspond to a selection by a user. For example, a user may select an object displayed on a display. A user may also enter one or more numbers, indicators, or other values via a user interface. A user interface device may provide indicia of received input. The indicia may be generated by the user interface device based in the received input. The indicia may include one or more of an object to be tracked, a relative distance, and a motion response. The indicia may be included in flight data. In embodiments, the user interface device may provide flight data that includes indicia associated with an input received at the user interface device. The indicia and/or flight data may be provided after output (e.g., display, audible output, etc.) of indicia of one or more detected objects by the user interface device 390.

According to various aspects of the present disclosure, flight data is used or may be used to control a drone automatically after launch. The flight data may be used to automatically control a drone after launch from a drone port. The flight data may be used to automatically control a drone after the drone exits a chassis. A processing circuit of a drone may receive flight data and control components of the drone in accordance with the flight data. For example, a processing circuit may use flight data to control one or more fans to control a physical position of the drone. A processing circuit may control an orientation of a camera of the drone based on flight data. For example, a processing circuit may control a gimbal mount in accordance with flight data. Flight data may include various indicia which may be applied by the drone to automatically control (e.g., position, orient, steer, fly, travel) the drone. In embodiments, the flight data includes indicia. Indicia may include one or more values, identifiers, indicators, or other data usable by a receiving device to perform an associated subsequent task.

In embodiments, flight data may include one or more of indicia of an object, a relative position for a drone, and a motion response for a drone. The object may be an object to be tracked. The indicia of an object may include one or more of an object for optical tracking and an object for positional tracking. In embodiments, an object for optical tracking may be a same object as an object for positional tracking. The indicia for an object may indicate whether an associated object is an object for positional tracking or an object for optical tracking. A camera of a drone may orient a camera of the drone toward an object for optical tracking in accordance with indicia for the object. A camera of a drone position itself relative to an object for positional tracking.

For example, a display of user interface device 390 may present indicia of a vehicle and a person. User interface device 390 may then receive input corresponding to a user selection of the vehicle as an object for positional tracking and the person as an object for optical tracking. User interface device 390 may transmit indicia corresponding to each object to device 305. User interface device 390 may include a short-range radio communication circuit to transmit the indicia to device 305. The transmitted indicia may be included in flight data transmitted to device 305. User interface device 390 may provide flight data comprising indicia of the selected object for optical tracking and the selected object for positional tracking to device 305, which may further provide this flight data to drone 330. Such flight data may be provided to drone 330 prior to drone 330 exiting drone port 320. Upon exiting the drone port 320, drone 330 may control orientation of camera 332 based in the indicia of the object for optical tracking. Upon exiting the drone port 320, drone 330 may control fans and other flight-related components of the drone 330 to position itself in accordance with the object for positional tracking. Indicia for each of one or more objects associated with inputs received from a user interface device 390. Indicia for each of one or more objects associated with inputs at user interface device 390 may be received via short-range radio communication circuit 350-3 at device 305.

User interface device 390 may also receive inputs corresponding to relative position for a drone and a motion response for a drone. User interface device 390 may generate indicia or flight data comprising indicia of a relative position for a drone and/or a motion response for a drone A relative position may include one or more of an azimuth value, an altitude value, a relative distance value from the object, and geofencing data.

An azimuth may include an angle relative to an object for positional tracking to which a drone should position itself in-flight upon exiting a drone port. For example, an azimuth value may include a value of three hundred sixty degrees indicating that a drone should position itself north of an object for positional tracking. Alternately, an azimuth value may include a value of one hundred eighty degrees indicating that a drone should position itself south of an object for positional tracking, a value of ninety degrees indicating that a drone should position itself east of an object for positional tracking, or a value of two hundred seventy degrees indicating that a drone should position itself west of an object for positional tracking. An azimuth value may be between one and three-hundred sixty degrees as well, corresponding to other directions around an object for positional tracking. Other coordinate systems and/or relative positional values may be employed in embodiments according to various aspects of the present disclosure as well. An input corresponding to an azimuth value may be received via a user interface device 390 and indicia corresponding to this value may be provided as flight data to a drone, thereby enabling a drone to automatically position itself at a corresponding angle upon exiting a drone port.

An altitude may include a height relative to an object for positional tracking to which a drone should position itself in-flight upon exiting a drone port. For example, an altitude value may include a value of ten feet, twenty feet, thirty feet, or forty feet or more above an object for positional tracking. In embodiments, other altitude values may be provided as well, including more or less granular values received via a device such as user interface device 390. For example, an altitude value may include one or more of a low altitude value, a medium altitude value, and a high altitude value. In embodiments, an altitude value may also include a height above ground to which a drone will thereby position itself in addition to and/or a height above an object for positional tracking. In embodiments, an altitude value may also include a height above sea level to which a drone will thereby position itself upon launch. Other measures of height or distance above an object or surface may be employed in embodiments according to various aspects of the present disclosure as well.

A relative distance may include a distance away from an object for positional tracking to which a drone is to be positioned. For example, a relative distance value may include a value of zero feet, five feet, ten feet, twenty feet, thirty feet, forty feet, fifty feet, or sixty feet or more away from an object for positional tracking. In embodiments, other relative distance values may be provided as well, including more granular values or less granular values received via a device such as user interface device 390. For example, a relative distance value may include one or more of a near distance value, a medium distance value, and a far distance value. A drone may receive indicia of a relative distance in flight data and determined a specific relative distance at which to position itself in accordance with the indicia as well as other objects or factors in the environment to which it subsequently travels.

In embodiments, a relative distance may correspond to a lateral distance. In embodiments, a relative distance may correspond to a distance in a plane corresponding a plane of the ground. A relative distance may be separate from an altitude and each may have corresponding or associated indicia in flight data. In such embodiments, a relative distance may correspond to a radius around a vehicle along a ground plane in which the object is located. In such embodiments, a relative distance of zero feet may be associated with a drone being positioned directly above a tracked object.

In other embodiments, a relative distance may correspond a direct distance between a tracked object and a drone. In such embodiments, a drone may automatically determine an altitude. For example, a drone may travel to a position at which a lateral distance to the object and vertical distance between ground and the drone are equal and a distance between the drone and tracked object equals the relative distance. Alternately, a default altitude may be employed. For example, a default altitude of ten feet, fifteen feet, twenty feet, or greater than twenty feet may be employed and a position of the drone may be based on the relative distance and the default altitude. In other embodiments, a relative distance may correspond to a direct distance and an angle between the object and position of the drone and ground may be determined in accordance with indicia of an altitude that may be included in flight data.

A relative position may also include geofence data. Geofence data may include indicia of one or more limits for positioning a drone. A limit may include a distance from a drone port for a drone. Geofence data may include one or more distances in one or more directions relative to a position of a drone port of a drone beyond which the drone is prevented from automatically positioning itself. For example, a processing circuit may compare a limit in geofence data with a distance between a current position of the drone and a position of a drone port from which the drone was launched. A limit may be compared during an adjustment in position of the drone. If a distance between a drone port and a current position exceeds a limit in geofence data, a processing circuit of the drone may control one or more fans of the drone to prevent further motion of the drone in the direction. Geofence data may establish a virtual barrier around a chassis from which a drone is prevented from exiting. The geofence data, along with the application of such geofence data, may prevent a drone from traveling out of a line of sight of a vehicle and/or chassis, out of a range of communication of a chassis, and/or to a distance at which a drone may have insufficient batter power to return to a chassis.

A motion response may comprise indicia regarding an adjustment to be made by a drone in response to detected movement of a tracked object. An adjustment may comprise an adjustment to a position of a drone. A drone may process image data to detect movement of an object being tracked. In embodiments, the object being tracked may correspond to an object for positional tracking. In response to detected movement, the motion response may be applied. A drone may apply a motion response by selectively controlling one or more fans of the drone in accordance with the motion response, thereby adjusting a position of the drone. A motion response may be applied independent of control of a camera of the drone. For example, a camera of a drone may continue to be oriented toward an object for optical tracking, even though a position of an object for positional tracking may change. In embodiments, a position of an object for optical tracking may change, but a position of a drone may not change when a position of an object for positional tracking does not change. As noted above, an object for optical tracking and an object for positional tracking may be a same object in accordance with various aspects of the present disclosure. In embodiments according to various aspects of the present disclosures, a motion response may include a hold, follow, or return motion response.

A motion response may include indicia in flight data of a hold motion response. If movement of a tracked object is detected, a drone may process flight data including the indicia of the hold motion response. In accordance with the hold motion response, a drone may maintain its current position. For example, a processing circuit in the drone may control fans of the drone to maintain a current position. A current position may include a position of the drone upon detecting the movement of the object being tracked. A current position may include an altitude of the drone. A current position may include a position of the drone relative to a drone port from which the drone was previously launched. A current position may include a position associated with an output of a GPS receiver upon detection of the movement of the target. A drone may maintain (e.g., not change) a lateral position in accordance with a hold motion response. A drone may maintain a longitudinal position in accordance with a hold motion response. A drone may maintain an altitude in accordance with a hold motion response. In embodiments, an orientation of a camera of a drone may continue to track an object upon detection of movement, though a position of a drone itself may not change. In accordance with a hold motion response, a drone may no longer be controlled according to a relative position in flight data. In embodiments, a drone may hold its position in accordance with a hold motion response until a second input is received. A second input may comprise a signal from an external device. The external device may include one of a user interface device and a device configured to be mounted on a vehicle.

A motion response may include indicia in flight data of a follow motion response. If movement of a tracked object is detected, a drone may process flight data including the indicia of the follow motion response. In accordance with the follow motion response, a drone may adjust its position based on a change in a position of an object being tracked. A position of the drone may be adjusted upon detecting the change in the position of the object being tracked in accordance with a follow motion response. For example, a detected movement may include movement of a tracked object in a first direction. In response and in accordance with a follow motion response, a processing circuit in the drone may control fans of the drone to cause the drone to travel in a second direction, the second direction determined in accordance with the first direction. A second direction may be a same direction as the first direction. The second direction may be parallel to the first direction. A second direction may maintain a relative position of a drone with respect to an object being tracked, even though the object has moved or continues to move. In other embodiments, a processing circuit in the drone may control fans of the drone to cause the drone to travel in a second direction selected to intersect with the first direction. Adjusting a position of the drone in a second direction may include maintaining an altitude of the drone. Adjusting a position of the drone in a second direction may include changing one or more of a lateral or longitudinal position of the drone. Adjusting a position of the drone in accordance with a follow motion response may include adjusting a position of the drone in one or more second directions, each direction associated with a first direction of a movement of the object being tracked. In embodiments, a drone may maintain a relative distance to an object being tracked. In embodiments, an orientation of a camera of a drone may continue to track an object upon detection of movement, concurrent with adjustment of a position of the drone in accordance with a follow motion response. A follow motion response may include maintaining a drone within a certain radius of a moving object being tracked. In embodiments, the radius may correspond to a relative distance in flight data. In embodiments, a drone may adjust its position (i.e., follow) in accordance with a changing position of an object being tracked until a second input is received. A second input may comprise a signal from an external device. The external device may include one of a user interface device and a device configured to be mounted on a vehicle.

A motion response may include indicia in flight data of a return motion response. If movement of a tracked object is detected, a drone may process flight data including the indicia of the return motion response. In accordance with the return motion response, a drone may adjust its position to return to a drone port. A return motion response may include a drone automatically positioning itself in a drone port from which it was previously launched. A position of a drone may be adjusted in a return motion response in order to store, place, and/or land a drone in a chassis of a vehicle from which was previously launched. In embodiments, an orientation of a camera of a drone may continue to track an object upon detection of movement, though a position of a drone may change to return to a drone port. A camera of the drone may continue to capture image data in a direction of an object for optical tracking, even though the drone may be moving in a direction away from this object. A camera of a drone may continue to capture image data during a return motion response. A camera of a drone may capture image data continuously during a return of the drone to a drone port and after the drone has landed back in the drone port. Such image capture may form a continuous image data (e.g., video data) that includes image data captured while the drone is returning to the drone port and while the drone has landed back in the drone port. A return motion response may include capturing image data with a camera of the drone through a window of a drone port while the drone is landing in the drone port. A return motion response may include positioning a drone such that a camera of the drone captures image data through a window of the drone port during and after landing of the drone in the drone port. In embodiments, a drone may continue a return motion response until it has landed in a drone port. In embodiments, a return motion response may include continuing to capture image data with a camera of the drone through a window of a drone port after the drone has landed in the drone port. In such embodiments, a drone may continue to capture image data in accordance with a return motion response until a second input is received. The second input may be received from an external device. The external device may include one of a user interface device and a device configured to be mounted on a vehicle.

In embodiments, certain flight data may be determined automatically by a drone. For example, flight data may include indicia of an object for optical tracking. A drone may apply predetermined indicia for other flight data in order to automatically position itself with respect to the object upon being tracked. The predetermined indicia may include one or more default values. For example, a processing circuit may determine an object for optical tracking is also an object for positional tracking by default, absent contrary or other indicia being received in flight data prior to launch of the drone. A processing circuit may also apply one or more default values for a relative position and/or a motion response by default, absent related indicia being provided in received flight data.

In embodiments, a drone may automatically determine default flight data based on an environmental condition detected by the drone itself. For example, a processing circuit may process image data to detect whether rain is falling in an environment external to a chassis. If rain is falling, a default altitude of a drone may be automatically set lower and/or a relative distance may be automatically set to a lower value than if rain is not determined to be falling. Lower values in such embodiments may enable a drone to obtain image data from a position closer to an object being tracked during adverse environmental conditions. Other manners of automatically determining flight data may also be employed in embodiments according to various aspects of the present disclosure.

In embodiments, a system for providing security functions for a vehicle may include a remote computing device. For example, system 300 includes a remote computing device 392. Remote computing device 392 may be positioned at a remote location from a location of a vehicle on which device 305 may be mounted. Remote computing device 392 may include a display. The display may be touchscreen device. Remote computing device 392 may also include one or more of a keyboard, mouse, or other user input device to receive input signals from a user. In embodiments, a remote computing device includes a computing device of an agency associated with a vehicle on which a device 305 may be mounted. The remote computing device 392 may be a computer-aided dispatch computing device. The computer-aided dispatch computing device may be configured to display information related to a request for emergency services received by the agency. A request may include a phone call. The request may be received and conducted separately (e.g., from a different source, in a different communication channel, at a different time, etc.) from communication between a device 305 and the remote computing device 392. The computer-aided dispatch computing device may display information related to the request. For example, the computing device may display a location associated with the request. The computer-aided dispatch computing device may also receive input related to the request. For example, the computing device may receive input by way of a keyboard, mouse or other user interface component of the remote computing device. The input may correspond to resources being assigned to a request, such as an identifier of a vehicle on which device 305 may be mounted. A user of a remote computing device may be a dispatcher. In embodiments, the user may be a law enforcement officer.

Remote computing device 392 may also present information from device 305 to a user. The information may include image data captured by a camera of device. The camera may include one or more of camera 332 and cameras 370. The information may include indicia of one or more objects detected in image data captured by a camera. For example, a display of remote computing device 392 may present image data from a camera at a vehicle along with indicia of a detected object in image data captured by camera 332. The indicia may be generated based on processing of image data by one or more of drone 330 and computing device 340. The processing may include object detection and provide indicia of detected objects as output. For multiple objects detected, indicia may be generated for each of a plurality of objects detected in image data. For example, remote computing device 392 may present indicia associated with each of a vehicle and a person detected in image data captured by a camera 332 of drone 330. The indicia, image data, and other data from a vehicle presented via remote computing device 392 may be received via a long-range radio communication circuit. Remote computing device 392 may include a long-range radio communication circuit for communication with device 305.

Remote computing device 392 may also receive inputs from a user. The inputs may correspond to a selection by a user. For example, a user may select an object displayed on a display. A user may also enter one or more numbers, indicators, or other values via a user interface. A user interface device may provide indicia of received input. The indicia may be generated by the remote computing device based in the received input. The indicia may be included in flight data. In embodiments, the remote computing device may provide flight data that includes indicia associated with an input received at the remote computing device. The indicia and/or flight data may be provided after output (e.g., display, audible output, etc.) of indicia of one or more detected objects by the remote computing device 392. For example, a display of remote computing device 392 may present indicia of a vehicle and a person detected in image data captured by a camera of device 305. Remote computing device 392 may then receive input corresponding to a user selection of at least one of a vehicle as an object for positional tracking and a person as an object for optical tracking. In other embodiments, an input corresponding to a selection of a same object as both an object for optical tracking and an object for positional tracking may be received. Remote computing device 392 may transmit indicia corresponding to one or more such objects to device 305. The transmitted indicia may be included in flight data transmitted to device 305. Remote computing device 392 may provide flight data comprising indicia of the selected object for optical tracking and the selected object for positional tracking to device 305, which may further provide this flight data to drone 330. Such flight data may be provided to drone 330 prior to drone 330 exiting drone port 320. Upon exiting the drone port 320, drone 330 may control orientation of camera 332 based in indicia of the object for optical tracking in the flight data. Upon exiting the drone port 320, drone 330 may control fans and other flight-related components of the drone 330 to position itself in accordance with indicia of an object for positional tracking in the flight data. Indicia for each of one or more objects associated with inputs received from a remote computing device 392 may be transmitted via a long-range radio communication circuit of the remote computing device 392. Indicia for each of one or more objects associated with inputs may be received via a long-range radio communication circuit 350-2 at device 305.

Remote computing device 392 may also receive inputs corresponding to a relative position for a drone and a motion response for a drone. The inputs may also correspond to user selections associated with a relative position and/or motion response for a drone. Remote computing device 392 may generate indicia of a relative position and/or a motion response for a drone. Remote computing device may transmit indicia or flight data comprising indicia of a relative position for a drone and/or a motion response for a drone in response to the received inputs.

Although a chassis may eliminate the installation and maintenance of all wires and/or cabling inside a vehicle, some wires and/or cables may be useful. For example, wiring may be installed inside the vehicle to carry electrical power from the battery/alternator of the vehicle up to the chassis. The wiring passes through the outside of the vehicle (e.g., via a hole) into the chassis. The need to run wiring for power may be eliminated by having a power supply in the chassis.

Wires from the chassis into the cabin of the vehicle may be useful to communicate information to and from the computer, to control the radar/lidar (e.g., vehicle selection, report of speed), to control other equipment (e.g., boom up, boom down), report equipment failures, and communicate information to and from radios. The number of wires needed to communicate data to and from the human interface inside the cabin of the vehicle may be minimized by having the computer act as the port for communications and/or control for all equipment. All wires into the cabin may be eliminated by using wireless communication between any equipment in the chassis and the user interface in the cabin.

A chassis will speed the installation of equipment on a security vehicle. Installation may be accomplished by attaching the chasses to the exterior roof of the vehicle, and running a few wires (e.g., power, user interface) from the interior of the vehicle to the chassis.

Maintenance of a security vehicle will be simplified because the interior of the vehicle will not need to be disassembled to access equipment and wiring. Equipment may be serviced by opening doors or lids on the chassis to access equipment. The exterior sides may be remove to access equipment if necessary. Equipment may be easily removed from the chassis and replaced with a new unit. The entire chasses may be replaced without needing to rewire or disassemble the interior. If the user interface on the interior of the vehicle fails, it could be removed for repair or replaced without disassembling the interior of the vehicle because the wiring between the user interface may be left intact and just the user interface replaced.

A chassis may be weather tight. A chassis may be enclosed with a material that is transparent to RF waves.

The width of a chassis may be as wide as or wider than the width of a vehicle. The length of a chassis may be any portion of or more than the length of the roof of a vehicle. The height of a chassis may be any height (e.g., 4-18 inches) needed to enclose the equipment. A chassis may be expandable. A chassis may be expanded at installation or after installation. A chassis may expand in any dimension (e.g., width, height, length)

Figure 4:
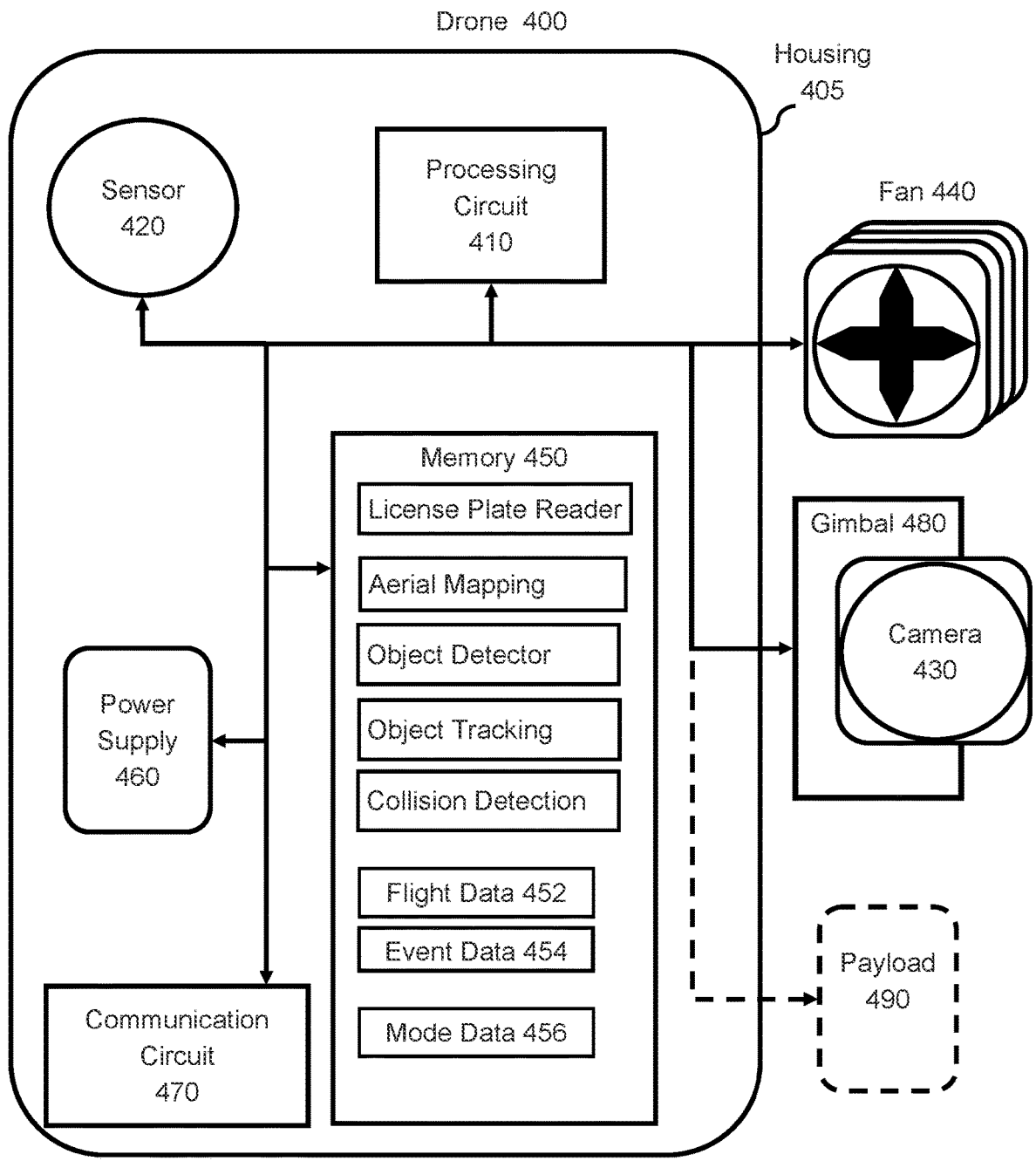
FIG. 4 is a diagram of a drone according to various aspects of the present disclosure.

In embodiments according to various aspects of the present disclosure, a system for providing security functions for a vehicle may include a drone. A drone may include an unmanned aerial vehicle. A drone may be sized to fit in a drone port mounted on a vehicle. Dimensions of a drone may be selected to enable a drone to be enclosed within a drone port. An implementation of a drone according to various aspects of the present disclosure is shown in FIG. 4. Drone 400 includes housing 405, processing circuit 410, sensors 420, a camera 430, fans 440, memory 450, a power supply 460, communication circuit 470, and gimbal mount 480. Power supply 460 may provide electrical power to one or more other components shown in FIG. 4. In embodiments, power supply 460 may include a battery and/or be a rechargeable power supply. Drone 400 may optionally include a payload 490. Drone 400 and camera 430 may perform functions or be configured to perform functions of a drone and a camera respectively as discussed elsewhere herein.

A housing provides structure for holding the components of a drone in position so they can cooperate to perform the functions of a drone. A house may be referred to as a frame (e.g., airframe). A housing may be formed of a rigid, light-weight material. A frame is formed of a material with sufficient strength to withstand the forces (e.g., torque, acceleration, movement, vibration) associated with a drone and flight. Components of a drone may be mounted in the housing. The components of a drone may be mounted to the housing. For example, fans 440, gimbal mount 480, and/or payload 490 may be mounted to an external surface of housing 405 of drone 400.

A processing circuit may control, in whole or in part, operations of a drone. A processing circuit may control the flight of a drone. A processing circuit may autonomously control the flight of a drone. A processing circuit may control a drone based on flight data. A processing circuit may control image data captured by a camera of the drone. A processing circuit may process image data captured by a camera of a drone. A processing circuit may execute one or more modules on image data to generate additional data. The additional data may be separate from the image data. The additional data may comprise indicia. Indicia may include one or more values, identifiers, indicators, or other data usable by a device to perform a subsequent task. The additional data may be generated based on the processing of image data by the processing circuit. The additional data may not exist until image data is processed by a processing circuit. The additional data may be output from the processing circuit and provided to one or more other components or devices.

A processing circuit may control communication (e.g., transmission, reception) of a communication circuit. A processing circuit may cooperate with a camera and a communication circuit to transmit image data. A processing may receive instructions from a communication circuit for controlling the flight of the drone. The instructions may include flight data. A processing circuit may receive information from a communication circuit for identifying an object for tracking. The information may include indicia of an object to be tracked.

A processing circuit may provide and/or receive electrical signals whether digital and/or analog in form. A processing circuit may provide and/or receive digital data (e.g., information) via a bus using any protocol. A processing circuit may receive data, manipulate data, and provide the manipulated data. A processing circuit may store data and retrieve stored data. Data received, stored, and/or manipulated by a processing circuit may be used to perform a function.

In embodiments, a processing circuit may include any circuitry and/or electrical/electronic subsystem for performing a function. A processing circuit may execute one or more stored programs. A processing circuit may execute one or more stored modules. A processing circuit may include a digital signal processor, a microcontroller, a microprocessor, an application specific integrated circuit, a programmable logic device, logic circuitry, state machines, MEMS devices, signal conditioning circuitry, memory, data busses, and/or address busses. A processing circuit may include conventional passive electronic devices (e.g., resistors, capacitors, inductors) and/or active electronic devices (e.g., op amps, comparators, analog-to-digital converters, digital-to-analog converters, programmable logic). A processing circuit may include output ports, input ports, timers, embedded memory, and/or arithmetic units.

A processing circuit may control the operation and/or function of other circuits and/or components of a system. A processing circuit may receive data from other circuits and/or components of a system. A processing circuit may receive status information regarding the operation of other components of a system. A processing circuit may provide commands (e.g., instructions, signals) to one or more other components responsive to data and/or status information. A command may instruct a component to start operation, continue operation, alter operation, suspend operation, and/or cease operation. Commands and/or status may be communicated between a processing circuit and other circuits and/or components via any type of bus.

Processing circuit 410 may control, in whole or in part, the operations of drone 400. Processing circuit 410 may control flight of drone 400. Processing circuit 410 may control launch of drone 400 from a drone port. Processing circuit 410 may control flight of drone 400 autonomously in accordance with flight data. Processing circuit 410 may receive flight data prior to drone 400 exiting a drone port. Processing circuit 410 may control flight of drone in accordance with inputs from sensors 420. Processing circuit 410 may control flight of drone in accordance with image data from camera 430. Processing circuit 410 may control flight of drone in accordance with data received via communication circuit 470. Processing circuit 410 may control drone 400 to travel to a position. Processing circuit 410 may control drone 400 to adjust a position of drone 400. Processing circuit 410 may control drone 400 to adjust a position of drone 400 in air. Processing circuit 410 may control fans 440 to position drone 400 and/or perform other functions.

Processing circuit 410 may receive image data from camera 430. Image data may include video data. In other embodiments, processing circuit 410 may receive image data from camera 430 and generate video data from image data captured by camera 430 over a period of time. Processing circuit 410 may execute one or more modules on image data from camera 430. Modules executed or executable by processing circuit 410 may be received from memory 450. Execution of one or more modules may generate additional data. Processing circuit 410 may process image data to generate additional data. Processing circuit 410 may store image data and generated additional data in memory 450.

Processing circuit 410 may control communication (e.g., transmission, reception) of communication circuit 470. Processing circuit 410 may control transmission of data from communication circuit 470. Processing circuit may receive data via communication circuit 470. Processing circuit 470 may transmit image data from drone 400 via communication circuit 470. Processing circuit 470 may transmit additional data generated on drone 400 via communication circuit 470. For example, processing circuit 410 may transmit indicia of a detected object via communication circuit 470. Processing circuit 470 may receive flight data via communication circuit 470.

A communication circuit transmits and/or receives information (e.g., data). A communication circuit may transmit and/or receive (e.g., communicate) information via a wireless and/or wireless communication link. A communication circuit may communicate using wireless (e.g., radio, light, sound, vibrations) and/or wired (e.g., electrical, optical) mediums. A communication circuit may communicate using any wireless (e.g., BLUETOOTH, ZIGBEE, WAP, WiFi, NFC, IrDA, LTE, BLE, EDGE, EV-DO) and/or wired (e.g., USB, RS-232, Firewire, Ethernet) communication protocol. A communication circuit operable or configured to transmit and/or receive information over a wireless medium and/or via a wireless communication protocol may include a wireless communication circuit.

A communication circuit may transmit and/or receive (e.g., communicate) data via a wireless link. A communication circuit may perform short-range wireless communication and/or long-range wireless communication. Short-range wireless communication may have a transmission range of approximately 20 cm-100 meters. Communication protocols for short-range wireless communication may include BLUETOOTH, ZIGBEE, NFC, IrDA and WiFi. Long-range wireless communication may have a transmission ranges up to 15 kilometers. Communication protocols for long-range wireless communication may include GSM, GPRS, 3G, LTE, and 5G. A communication circuit may communicate via a base station using long-range wireless communication.

In embodiments, a communication circuit include a data connector configured to communicate with a data connector in a drone port. A data connector in the drone may communicate with a drone port in accordance with one or more wired or wireless communication protocols. In embodiments, a data connector of drone 400 may include a communication circuit 470 configured to communication in accordance with at least one of a USB protocol and a WIFI protocol. Drone 400 may receive flight data via a data connector of communication circuit 470. Drone 400 may transmit indicia of a detected object, image data, and/or event data via a data connector of communication circuit 470.

A processing circuit may detect an object in image data. Detecting an object in image data may include generating indicia associated with the detected object. The indicia may be provided as output from the processing circuit. In embodiments, one or more objects in image data may be detected by a processing circuit. For example, multiple objects in same image data may be detected by a processing circuit. Output data comprising indicia of each detected object may be generated by the processing circuit. The output data may be transmitted from the device in which it is generated.

Detection of an object may include determining a pixel location of an object in image data. A pixel location may include one or more locations of one or more pixels associated with an object in image data. Detecting an object may include generating indicia associated with the pixels determined to represent an object. The indicia may include a boundary box. The indicia may include one or more pixel coordinates in image data. The indicia may include other data indicative of one or more pixels associated with one or more detected objects represented in image data.

Detecting an object may also include classifying an object. An object represented in image data may be classified as a type of object. An object classification may include a category to which an object belongs. For example, an object may be classified as a vehicle or a person. In embodiments, an object may be classified as a tree, pole, wire, or building, vehicle, or person. Indicia of a classification of an object may be generated as output data. Detecting an object in image data may include classifying the object and generating associated indicia of the classification for the detected object.

In embodiments, detecting an object may include determining a position of the object. A position of an object may include a relative position between the object and a camera that captures image data in which the object is represented. A position may include a position of the object in three-dimensional space. The position may include the position of the object in the area around a vehicle. A position of an object may be determined relative to predetermined objects in the captured image data. For example, a position of an object may be determined based on a location of an object in image data relative to a front of a vehicle to which a device according to various aspects of the present invention is mounted. In embodiments, a position of an object may be determined from image data captured by a camera of a drone. The image data from a camera of the drone may be processed by a processing circuit of the drone or a computing device to generate indicia of a position of the object. In embodiments, image data may include stereoscopic image data from which a position of an object may be determined. Image data from a plurality of cameras may be processed by a processing circuit to determine a position of an object, wherein each camera has a different angle of view in which image data of the object is captured. In embodiments, determining a position may also incorporate input from one or more other components. For example, a position may be determined using one or more laser range finders, lidar systems, ultrasound detectors, and/or other wireless distance detectors. Indicia of a position of an object may be included in output data associated with a detected object.

In embodiments, a processing circuit may detect an object in image data by applying an object detector module to captured image data. The object detector module may be stored in memory. For example, processing circuit 410 of drone 400 may execute an object detector module on image data from camera 430. The module may be stored in memory 450. The module may comprise instructions stored in one or more non-transitory computer readable mediums that, when executed by processing circuit 410, cause the drone 400 to perform steps for detecting an object in image data. In embodiments, the module may comprise a machine learning model, trained to detect one or more objects in image data. In embodiments, the module may implement a neural network trained to generate one or more indicia of a detected object. The processing circuit 410 may detect multiple objects in image data and generate indicate of each object. Indicia of each detected object may include one or more of a pixel location in image data of the detected object, a classification of the detected object, and a position of the object.

Indicia of a detected object may be provided to other components in drone 400 or device, such as one or more devices shown in FIG. 3. For example, indicia of a detected object may be generated by processing circuit 410 and stored in memory 450. Indicia of a detected object may be provided to communication circuit 470 for transmission to other devices, such as a computing device in a chassis, a user interface device, and a remote computing device.

In embodiments, object detection may be performed by other components of a system. For example, a drone may capture image data and provide this image data to a computing device in a chassis of a device configured to be mounted on a vehicle. The computing device may execute an object detector module on the received image. Data comprising indicia of objects detected by a processing circuit of the computing device may be transmitted to another device, including one or more of a remote computing device and a user interface. Accordingly, processing of image data may be distributed across multiple processing circuits, a processing circuit integrated with a drone and a processing circuit integrated with a device configured to be mounted on a vehicle. In embodiments, a computing device may include computing device 340. In embodiments, an object detector module may be stored in storage system 342. Computing device 340 may read and execute an object detector module from storage system 342.

A processing circuit in a drone may process image data using other modules as well. Each module may be stored in memory. A module may comprise instructions that, when executed by a processing circuit, cause the device in which the processing circuit is provided to perform one or more functions. A module may comprise a machine learning model, trained to process image data to generate predetermined output. For example, a module may be trained to generate one or more predetermined types of indicia. The module may be trained to process image data. In embodiments, the module may implement a neural network trained to generate one or more indicia associated with image data. Executing a module with a processing circuit may cause the processing circuit to generate output data comprising one or more indicia associated with a predetermined function of the module. In embodiments, a module may comprise a dedicated circuit and/or a circuit configured to generate a predetermined set of indicia upon processing of image data by the module.

A memory may store and/or retrieve data. A memory may store and/or retrieve digital data. A memory may store and/or retrieve image data captured by a camera. A memory may store and/or retrieve data that results from analysis of image data. A processing circuit may store data in a memory. A processing circuit may retrieve data from a memory. A memory may include non-volatile memory. Instructions for execution by a processing circuit may be stored in non-volatile memory. An implementation of a memory may include any semiconductor, magnetic, optical technology, or combination thereof.

Memory 450 is a device configured to store data for access by processing circuit 410. Memory 450 may include non-volatile memory (e.g., flash memory), volatile memory (e.g. RAM memory), or a hybrid form of computer-readable medium for data storage. Moreover, the memory 450 may include one or more cache memories for high-speed access. In embodiments, camera 430 may capture multiple images in a matter of seconds. Multiple levels of cache memory may be used to ensure efficient execution. Memory 450 may closely operate with the processing circuit 410. For example, memory 450 may store multiple modules executable by processing circuit 410 to cause the processing circuit to perform functions. Modules stored in memory 450 may include machine learning models. Modules stored in memory 450 may execute neural networks. Modules applied by processing circuit 410 may be executed on input data to generate indicia associated with the input data. In embodiments, modules stored in memory 450 may be executed by processing circuit 410 on image data to generate indicia associated with the image data.

In embodiments, a module may be executed by processing circuit 410 in accordance with a setting. A setting may include one or more values indicative of whether and/or how a module should be executed by a processing circuit. A setting may be stored in memory 450 and selectively applied by a processing circuit to cause an associated module to be executed.

In embodiments, a setting may be applied in response to one or more of a control signal received by a drone and/or an input detected by a drone. For example, a signal from a user interface device may be received to apply one or more settings. A signal from a user interface device may be received to apply a mode of operation associated with one or more settings.

In embodiments, a drone may detect an input associated with a location or position of the drone and apply one or more settings automatically. For example, a drone may detect its position based in image data. The detected position may that the drone is at a position within a drone port. The drone may then automatically apply one or more settings. The settings may include those associated with one or more modes of operation for the drone. For example, a drone may detect its position using image data and automatically apply one or more settings associated with a fixed mode. A drone may also detect a position of the drone based on one or more signals from a communication circuit 470 or sensors 420. For example, a strength of a signal and/or indicia within a signal received via communication circuit 470 may indicate that drone 400 is positioned within a drone port. Alternately or additionally, one or more sensors 420 and/or camera 430 may detect indicia disposed in a drone port to detect that the drone 400 is positioned within a drone port and, in response, apply one or more settings automatically.

In embodiments, memory 450 may store a license plate reader module. Processing circuit 450 may read license plate numbers from image data by executing the license plate reader module. The license plate reader module may be executed on image data from camera 430 of the drone 400. Upon execution by the processing circuit, a license plate reader module may detect a license plate represented in image data and perform optical character recognition on the detected license plate in the image data. Indicia of one or more characteristics of the license plate may be generated by executing the license plate reader module on image data. The indicia may include one or more letters or numbers and/or a region (e.g., state, country, etc.) associated with issuance of the license plate. Multiple license plates may also be detected in image data. The license plate reader module may be selectively executed by the processing circuit 410. For example, the license plate reader module may be executed on image data from a camera 430 when the drone is positioned in a drone port. The license plate reader module may be executed while a vehicle is in motion. The license plate reader module may be executed on image data from a camera 430 when a vehicle on which the drone port is mounted is in motion. In embodiments, the license plate reader module may not be executed on image data from a camera 430 after the drone has launched from a drone port. Processing circuit 410 may execute the license plate reader module in response to an applied setting. A setting may include a value indicative of whether and/or how a module should be executed. A license plate reader module may be executed in a first mode of operation of the drone. The first mode may be a fixed mode of operation of the drone. A license plate reader module may not be executed in a second mode of operation of the drone. The second mode may be an aerial mode of operation of the drone. By executing a license plate reader module, a drone 400 and a camera 430 of the drone may preclude a need for additional components in a system to generate license plate related data. Capturing image data and executing a license plate reader module may also provide an additional use for a camera and processing circuit of a drone when the drone is not in flight.

In embodiments, memory 450 may store an aerial mapping module. Processing circuit 450 may detect objects in airspace around a vehicle and generate a map of the airspace by executing the aerial mapping module. The aerial mapping module may be executed on image data from camera 430 of drone 400. Upon execution by a processing circuit, an aerial mapping module may detect one or more objects in an area. The objects may include trees, poles, wires, buildings, and other structures. Detecting the objects may include detecting a relative position of each object in the area. Detecting the objects may include detecting relative dimensions of the object in the area. Indicia of the detected objects may be stitched, compiled, aggregated, or otherwise combined to generate a three-dimensional map of an airspace of an area through which a source of the image data is positioned and/or through which the source of the image data has travelled. An aerial map generated by execution of the aerial mapping module by processing circuit 410 may be stored in memory and/or offloaded from the drone via communication circuit 470. An aerial map may be used by a drone for reference during subsequent flight in in area. For example, an aerial map may be used by a drone to automatically avoid an object in an aerial and/or navigate around an object in an area represented in the aerial map.

The aerial mapping module may be selectively executed by the processing circuit 410. For example, the aerial mapping module may be executed on image data from a camera 430 when the drone is positioned in a drone port. An aerial mapping module may be executed on image data from a camera of a drone while a vehicle on which the drone port is mounted is in motion. In embodiments, an aerial mapping module may not be executed on image data from a camera of a drone after the drone has launched from a drone port. Processing circuit 410 may execute the aerial mapping module in response to an applied setting. An aerial mapping module may be executed in a first mode of operation of the drone. The first mode may be a fixed mode of operation of the drone. An aerial mapping module may not be executed in a second mode of operation of the drone. The second mode may be an aerial mode of operation of the drone.

An aerial mapping module may be selectively executed in a mode for various reasons. For example, an aerial mapping module may be executed when processing resources are available to perform the mapping and are not needed for other tasks, such as those related to flight. an aerial mapping module may also be executed with a quality of image data received during a mode is consistent enough to generate an aerial map.

In embodiments, memory 450 may store a collision detection module. Processing circuit 450 may detect objects in an environment and predict whether the detected objects may collide with a vehicle on which a drone port for the drone may be mounted by executing the collision detection module. The collision detection module may be executed on image data from camera 430 of the drone 400. Upon execution by the processing circuit, a collision detection module may detect one or more objects represented in image data and determine a path of travel of each object. The collision detection module may further detect if a path of travel of an object may intersect with a location of a vehicle from which the processed image data is captured. Indicia of a predicted collision may be generated by a processing circuit if the path of travel of the object and a location of a vehicle may intersect. Indicia of a predicted collision may be output from a drone. For example, warning data comprising indicia of a predicted collision may be transmitted to a user interface device in a cabin of the vehicle so that the warning data may be further presented to a user of the vehicle. The collision detection module may be selectively executed by the processing circuit 410. For example, the collision detection module may be executed on image data from a camera 430 when the drone is positioned in a drone port. The collision detection module may be executed while a vehicle is in motion. In embodiments, the collision detection module may not be executed on image data from a camera 430 after the drone has launched from a drone port. Processing circuit 410 may execute the collision detection module in response to an applied setting. A setting may include a value indicative of whether the collision detection module should be executed. A collision detection module may be executed in a first mode of operation of the drone. The first mode may be a fixed mode of operation of the drone. A collision detection module may not be executed in a second mode of operation of the drone. The second mode may be an aerial mode of operation of the drone. By executing a collision detection module, a drone 400 and a camera 430 of the drone may preclude a need for additional components in a system to predict a collision of a vehicle. Capturing image data and executing a collision detection module may provide an additional use for a camera and processing circuit of a drone when the drone is not in flight.

In embodiments, memory 450 may store an object tracking module. Processing circuit 450 may track a position of one or more objects in an environment by executing the object tracking module. The object tracking module may be executed on image data from camera 430 of the drone 400. Upon execution by the processing circuit, an object tracking module may detect a position of each of one or more objects in image data. The one or more positions may be tracked in each image of image data. In embodiments, a position associated with each of an object for optical tracking and an object for positional tracking may be tracking in image data captured by a camera of a drone. The one or more positions may be tracked over time in image data. Indicia of a position of each object may be generated by executing the object tracking module on image data. The indicia may include one or more or a relative position from a source of the captured image data, a specific position in three-dimensional space, and/or a pixel position within image data. Position data comprising indicia of an object may be provided as output from the processing circuit upon execution of an object tracking module. The position data may be stored in a memory, such as memory 450. The position data may be used by a processing circuit to perform subsequent functions.

For example, processing circuit 410 may process position data to control a gimbal mount 480. The position data may be used by the processing circuit 410 to control gimbal mount 480 to orient camera 430 in a direction relative to a tracked object. For example, a gimbal mount 480 may be controlled to adjust camera 430 such that an object associated with position data may be retained in an angle of view of camera 430. The gimbal mount 480 may be controlled to maintain a tracked object in a center of an angle of view of the camera 430. The position data may be processed over time to control gimbal mount 480 to adjust camera 430 as a position of a tracked object changes. Gimbal mount 480 may be adjusted by processing circuit 410 to orient camera 430 toward an object in motion. Gimbal mount 480 may also be adjusted to maintain a camera 430 oriented toward an object when a platform on which camera 430 is mounted is moving. For example, position data may be used to orient a camera toward a tracked object while drone 400 and/or a drone port in which the drone is positioned is moving. In embodiments, such position data may be used to ensure that image data captures an object selected for optical tracking.

According to various aspects of the present disclosure, processing circuit 410 may process position data to control one or more fans 440. The position data may be used by the processing circuit 410 to control fans 440 to position drone 400 relative to a tracked object. For example, fans 440 may be controlled to move drone 400 at an azimuth relative to a tracked object. Fans 440 may be controlled by processing circuit 410 based on position data to maintain drone 400 at a relative distance from a tracked object. Fans 440 may also be controlled to cause drone 400 to follow a tracked object. An object may be tracked in accordance with a motion response indicated in flight data. In embodiments, fans 440 may be controlled to position a drone in accordance with a position of an object selected for positional tracking.

In embodiments, a processing circuit may detect movement of an object being tracked to determine whether to execute a motion response. Movement may be detected based on position data of the object generated by the processing circuit. Movement may be detected based on position data generated by execution of an object tracking module by a processing circuit. Movement may be detected by executing an object tracking module on image data captured by a camera of a drone. Movement may be detected if a position of the object changes. Movement may be detected if an amount of change of a position exceeds a threshold. For example, movement may be detected if a current position of an object is greater than a threshold distance from a reference position. A reference position may include a first position at which the object was tracked by the processing circuit. In embodiments, movement may be detected if a current position of an object is greater than a threshold distance (e.g., five feet, ten feet, twenty feet, etc.) compared to a first position at which the object was located upon launch of the drone from a drone port. Movement may be alternately or additionally detected if position of an object changes by an amount greater than a threshold over a predetermined period of time. For example, movement may be detected if an object travels at least a predetermined distance (e.g., five feet, ten feet, twenty feet, thirty feet, etc.) within a predetermined period of time (e.g., five seconds, ten seconds, fifteen seconds, etc.). If movement of an object is detected by a processing circuit, a motion response may be initiated by a processing circuit of a drone. A motion response indicated in flight data on a drone may be executed by the processing circuit when movement of the object is detected. A processing circuit may control a drone according to a predetermined motion response if movement of a tracked object is detected.

In embodiments, memory 450 may also store flight data 452. The flight data may include indicia of one or more of an object to be tracked, a relative position, and a motion response. An object to be tracked may include one or more of an object for optical tracking and an object for positional tracking. One or more indicia in flight data may be received by a drone and stored in memory prior to launch of the drone from a drone port. One or more indicia may be received via a communication circuit of the drone. In embodiments, flight data stored in memory may include default indicia. For example, default indicia for an object for positional tracking and/or an object for optical tracking may correspond to a vehicle on which a drone port for the drone is mounted. Alternately, default indicia for an object for positional tracking and/or an object for optical tracking may correspond to a person detected in image data. Default indicia for an object for positional tracking and/or an object for optical tracking may correspond to an object closest to a center of image data being captured by a camera of a drone. Default indicia for a relative position may include predetermined values for an altitude, azimuth, relative distance, and geofence data. Default indicia for a motion response may include a return motion response. In embodiments, flight data for launching a drone may include one or more indicia received via a communication circuit and/or one or more default indicia stored in memory prior to launch. In embodiments, flight data may be stored in memory, received by a processing circuit, and/or enabled to be executed by a processing circuit prior to launch of a drone from a drone port. In embodiments, at least indicia of an object to be tracked may be received by processing circuit 410 and/or stored in memory 450 prior to launch of drone 400 from a drone port. In embodiments, at least indicia of an object to be tracked may be received via a communication circuit 410 prior to drone 400 exiting a drone port.

In embodiments, memory 450 may also store event data 454. Event data may include image data captured by a camera of a drone. For example, memory 450 may store image data captured by camera 430. Image data captured over time may include video data. Event data stored in memory 450 may include video data. The video data may include image data captured by camera 430 before and after a launch of drone 400 from a drone port. Image data may be captured continuously before, during, and after a time at which a drone is launched from a drone port. For example, processing circuit 410 may control camera 430 to capture image data continuously while drone 400 is launched from a drone port, including before and after the launch. By capturing video continuously, a drone may generate event data that includes images of objects and events external to a drone port leading up to a launch of the drone. Such event data, including images captured through a window of a drone port prior to launch, may provide a more complete record of an event, rather than images that are just captured after launch of a drone.

In embodiments, image data from a camera of a drone may be buffered for a predetermined period of time before launch of the drone. For example, captured image data may be stored for a predetermined time including one minute, two minutes, five minute, or greater than five minutes in memory. After the predetermined time, image data may be overwritten. After the predetermined time, image data may not preserved for storage. A memory may include a first-in-first-out buffer in which image data is stored for the predetermined prior of time. The buffer may include a circular buffer. Upon launch of the drone, buffered image data may be stored with image data captured after launch as event data in memory 450. The buffered data and post-launch image data may be stored as event data. The event data may be subsequently offloaded for review. For example, the event data may be offloaded from memory 450 to one or more of a user interface device 390 or a remote computing device 392 in embodiments according to various aspects of the present disclosure. By buffering image data and including the buffered image data with image data captured after launch of a drone, a more complete record of an event leading up to a launch of a drone may be preserved.

In embodiments, captured image data may be both buffered and transmitted from a drone to another device, such as a user interface device or a remote computing device. Image data may be buffered and transmitted at a same time. Same image data may be stored and memory and received by another device. Such embodiments may preserve image data to be included in event data, as well as permit inputs to be received in association with objects detected in the image data.

In embodiments according to various aspects of the present disclosure, a drone may be operated in a mode. A drone may be operated in a mode by applying mode data associated with the mode. Mode data for a mode may include one or more settings. A setting may include one or more values. A drone may be controlled in accordance with a mode by controlling one or more components of a drone based on the one or more values. Each value may be indicative of how a component of the drone should be controlled. Control of a component may include whether a component should be controlled. For example, one or more values may be applied in a mode to activate or deactivate a component of a drone. One or more values may be applied to adjust operation of a component. One or more values may be applied to process, not process, or selectively process image data to generate output data from the processed image data. In embodiments, a setting may include a value indicative of whether a processing circuit should execute a module. The one or more values of a setting may be applied by a processing circuit to change (e.g., adjust, increase, decrease, activate, deactivate, etc.) an operation of a drone. For example, a processing circuit of a drone may process mode data and control one or more of the processing circuit, one or more fans, a GPS receiver, a communication circuit, a camera, and a gimbal mount in accordance with the mode data.

Mode data may include mode data for a plurality of modes. Mode data for each mode may include one or more different settings. Mode data for a mode may be stored in memory. For example, memory 450 may store mode data 456. A drone may be controlled in accordance with a mode by applying mode data associated with the mode. Operating in different modes may include selectively applying a set of values for the mode among different sets of values stored in memory. For example, a memory of a drone may store mode data that includes a first set of values associated with a first mode and a second set of values associated with a second mode of operation of the drone. The modes may be selectively applied based on an input signal received by the drone. A processing circuit may read values from memory associated with a given mode and then activate or deactivate components of a drone, activate or deactivate processing of image data using a module, and control one or more components of the drone based on the values for the given mode.

In other embodiments, mode data comprising one or more values for a mode may be received by the drone and executed by the drone upon receipt. For example, a set of values for a mode may be received via a communication circuit of the drone. The values may then be received and applied by a processing circuit of the drone, thereby placing the drone into a mode associated with the set of values. In this example, the applied values may not be stored in memory prior to receipt by the communication circuit.

In embodiments, a drone may be operated at least two different modes. A first mode of the at least two different modes may include a fixed mode. A second mode of the at least two different modes may include an aerial mode. A fixed mode may be associated with a first set of values applied by a processing circuit of the drone. An aerial mode may be associated with a second set of values applied by the processing circuit of the drone. Each mode may have one or more values associated with one or more of at least one fan of the drone, a gimbal mount of the drone, a camera of the drone, one or more communication circuits of the drone, a positioning circuit of the drone, a processing circuit, and one or more executable modules for processing image data to generate one or more different output data. Values for a given component or manner of processing (e.g., via a module executable by a processing circuit, etc.) may be different between different modes, causing a drone to operate differently in each mode in accordance with the different values.

In embodiments, memory 450 stores mode data 456. Mode data 456 includes settings for at least two modes. A first mode includes a fixed mode. A second mode includes an aerial mode.

A fixed mode may include one or more settings associated with various components. A fixed mode may be applied while a drone is positioned in a drone port. A fixed mode may be applied while a drone port is stationary or in motion. A processing circuit of the drone may apply each setting to control one more components of the drone. For example, a setting may be deactivate fans of the drone. The fans of the drone may be off or inactive (e.g., not powered, not controlled, not required to perform a function, etc.) off in the fixed mode. The drone may be secured to the drone port, such that the drone may not exit the drone port. Yet, components of the drone may be activated and configured to perform functions based on the settings of the fixed mode. For example, a setting may cause a processing circuit to execute an object detector module. A setting may cause a processing circuit to execute a license plate reader module. A setting may cause a processing circuit to execute an aerial mapping module. A setting in the fixed mode may cause a processing circuit to execute a collision detection module. In embodiments, a setting may cause a processing circuit to not execute an object tracking module. In embodiments, a setting may be applied by a processing circuit to deactivate a gimbal mount or limit movement of a gimbal mount in one or more directions. A setting may also cause a communication circuit to be deactivated. For example, a long-range radio communication circuit may be deactivated in accordance with a setting of a fixed mode. A setting may also deactivate a GPS receiver of the drone. A setting for a fixed mode may also deactivate an infrared camera of the drone.

An aerial mode may include one or more settings associated with various components. One or more of the settings may be different from settings associated with a fixed mode. An aerial mode may be applied while a drone is in-flight. An aerial mode may be applied after a drone has launched from a drone port. A processing circuit of the drone may apply each setting from mode data for an aerial mode to control one more components of the drone. For example, a setting may activate fans of the drone. The fans of the drone may be activated continuously in an aerial mode. The fans of the drone may be controlled selectively to adjust a position of a drone in an aerial mode. In an aerial mode, other components may be controlled. Control may include deactivating an operation of a component in order to allow a drone to employ its resources to tasks related to flight. For example, a setting may cause a processing circuit to not execute an object detector module or discontinue execution of an object detector module. Instead, a setting in flight data for an aerial mode may cause a processing circuit to execute an object tracking module. A setting may cause a processing circuit to not execute or discontinue execution of a license plate reader module. A setting may cause a processing circuit to not execute or discontinue execution of an aerial mapping module. A setting in an aerial mode may cause a processing circuit to stop executing or discontinue execution of a collision detection module. In embodiments, a setting may cause a processing circuit to begin execution of the object tracking module based on an object detected by the object detector module. In embodiments, a setting may be applied by a processing circuit to activate a gimbal mount or permit a full, unlimited movement of a gimbal mount in one or more directions. A setting may also cause a communication circuit to be activated. For example, a long-range radio communication circuit may be activated in accordance with a setting of an aerial mode. A setting may also activate a GPS receiver of the drone. In an aerial mode, an infrared camera of a drone may be activated and begin capturing infrared image data of a target for optical tracking. Other combinations of settings may be included in a fixed mode and an aerial mode as well, including combinations in which a component is controlled in a same manner in each of a fixed mode and an aerial mode.

Settings in different modes may vary for various reasons. For example, A position of a drone during an aerial mode may decrease effectiveness of a license plate reading operation or decrease a number of license plates in an angle of view captured by the camera altogether. Accordingly, an automatic license plate reading module may be disabled, not executed by a processing circuit, not performed by a processing circuit, or otherwise set as inactive during an aerial mode for a drone. As another example, generating an aerial map may be too resource intensive or a field of view in captured image data may be too variable to be employed to generate aerial map in an aerial mode for the drone. Accordingly, an aerial mapping module may be disabled, not executed by a processing circuit, not performed by a processing circuit, or otherwise set as inactive during an aerial mode for a drone. During an aerial mode, a drone and a vehicle may be physically separate, preventing a collision detection module from being able to determine a path of the vehicle. Accordingly, a collision detection module may be disabled, not executed by a processing circuit, not performed by a processing circuit, or otherwise set as inactive during an aerial mode for a drone. Similarly, an object to be tracked may not be identified or identifiable in order for an object tracking module to properly function upon execution by a processing circuit in a fixed mode. Accordingly, an object tracking module may be disabled, not executed by a processing circuit, not performed by a processing circuit, or otherwise set as inactive during a fixed mode for a drone. In embodiments, an object tracking module may be executed by a processing circuit upon receipt of flight data, wherein the flight data include indicia of an object to be tracked.

In embodiments, a drone may include one or more sensors. For example, drone 400 includes sensors 420. Sensors 420 may include one or more of an altimeter, GPS receiver, position detector, accelerometers, gyroscopes, and other sensors that may enable a drone to initiate and maintain flight. In embodiments, sensors 420 may also include one or more distance detector. A distance detector may include one or more laser range finders, lidar systems, ultrasound detectors, and/or other wireless distance detectors. A distance detector may be used to determine a position of one or more objects detected in image data. For example, a laser range finder may be controlled by processing circuit 410 to determine a distance between the drone and a tracked object. Output from a distance detector may be used during execution of one or more of an object detector module and an object tracking module to generate indicia of a position of an object. One or more sensors 420 may be controlled in accordance with flight data, such as indicia of an object for positional tracking. One or more sensors 420 may provide signals to processing circuit 410 to enable processing circuit 410 to determine a current position of drone 400, movement of the drone 400, and/or control fans 440 to move drone 400 toward a predetermined position.

Fans 440 include structures and electronics required for a drone to fly and move. In embodiments, fans may include a frame (e.g., housing), propellers, pusher propellers, motors (e.g., brushless electric), landing gear, a power supply, and/or an electronic speed controller. Fans may include a processing circuit that controls and coordinates the operation of the fans (e.g., flight controller) to cause the drone to fly, land, turn, hover, or perform any other maneuver or operation related to flight. A processing circuit that controls other aspects (e.g., camera, communication) of the operation of the drone may perform the operations of a flight controller in whole or in part. For example, a flight controller for fans 440 may be implemented in processing circuit 410 for drone 400. Processing circuit 410 may control fans 440 to position a drone and/or perform one or more other functions discussed herein.

A camera includes one or more sensors for detecting physical properties. Physical properties may include light and sound. A sensor of the camera detects light. A sensor may include a semiconductor device such as charged coupled device (e.g., CCD). An area of the sensor (e.g., array) may be described as having rows (e.g., height) and columns (e.g., width) of pixels. Each pixel detects light. The pixels capture light at a moment in time to form an image. An image includes rows and columns of pixels. The pixels may represent objects that were in the field of view when the image was captured. A sensor may provide pixel data (e.g., image data) as digital data. Digital image data may be presented, for example on a display. An image may be comprehensible to a human. The digital data of an image may be processed (e.g., calculated, manipulated, analyzed) by a processing circuit. A processing circuit may detect an object in an image or image data captured by a sensor of a camera. Image data may include a single image (e.g., a still) or a sequence of images (e.g., video data) at a rate (e.g., 30 frame-per-second). A camera may capture images in color and/or in black and white. A camera may capture images in the visible light spectrum. A camera may capture images outside (e.g., infrared, ultra-violet, x-ray) the visible light spectrum.

A camera may include optics (e.g., lenses, filters). A camera may include one or more lenses. A lens of a camera may have a variable focal length. A focal length of the lens may be changed to captures images at different sizes. A focal length of the lens may be change to zoom into an area to capture images. A lens of a camera may have variable apertures. A processing circuit may control, in whole or part, the operation of the optics of a camera.

Drone 400 includes at least one camera 430. Camera 430 may be controlled by processing circuit 410. Image data captured by camera 430 may be received by processing circuit 410. Image data from camera 430 may also be provided by processing circuit 410 to other components of drone 400, such as memory 450 or communication circuit 470.

A camera may be mounted on a gimbal mount. A gimbal mount may be mounted to a drone. A camera may be positioned (e.g., oriented, aim, directed, rotated, etc.) by a gimbal mount to capture image data in a particular direction. The direction may include an associated angle of view. In embodiments, a gimbal mount may adjust a position of a camera in two or more directions and/or along two or more axes. A gimbal mount may include a gyroscope for stabilizing the camera against movement and/or vibration. A processing circuit may control, in whole or part, the operation of the gimble to position the camera. For example, camera 430 is mounted to gimbal mount 480. Processing circuit 410 may control gimbal mount to orient camera 430 in one or more directions as discussed herein. Processing circuit 410 may control gimbal mount 480 to orient camera 430 toward an object for optical tracking.

In embodiments, a drone may also include a payload. A drone may selectively attach at least one of a plurality of payloads prior to launch. A drone may selectively attach at least one of a plurality of payloads while the drone is still positioned in a drone port. For example, drone 400 is selectively attached to payload 490. A payload may include another camera, an infrared camera, radio communication equipment, a spotlight, and rescue equipment. Rescue equipment may include one or more of a portable communication device, a flashlight, rope, a mask, a flare, and/or other equipment configured to provide aid during an event. A drone may attach a payload upon positioning of the payload in a predetermined position within a drone port. For example, a drone may include a mechanical and/or magnetic mount, configured to attach to a payload upon positioning of the payload to a given location proximate the mount.

A drone may selectively detach from a payload. A drone may selectively detach from a payload upon receipt of an external signal. A drone may selectively detach from a payload upon receipt of a signal from another device. The other device may be a user interface device. A received signal may cause a drone to adjust a mount associated with a payload in order to release a payload. For example, a drone may demagnetize a mount upon receipt of an external signal by the drone. A drone may alternately or additionally open a clasp or other form of mechanical fastener upon receipt of an external signal. In embodiments, payload 490 includes one of another camera, an infrared camera, radio communication equipment, a spotlight, and rescue equipment.

Components of FIG. 4 may perform the functions of corresponding components respectively discussed elsewhere herein.

Figure 5:
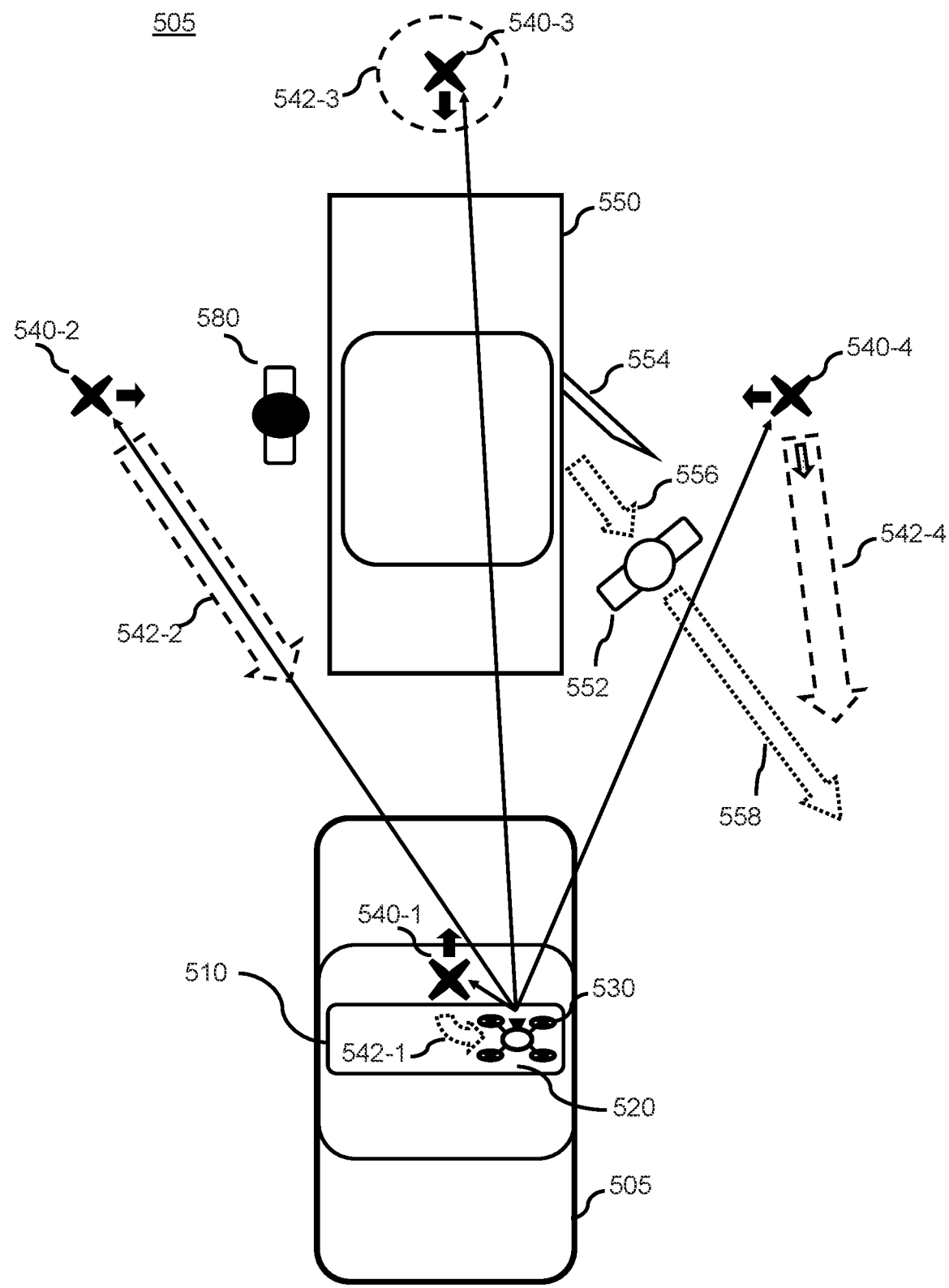
FIG. 5 is a diagram of a system according to various aspects of the present disclosure.

FIG. 5 illustrates a system according to various aspects of the present disclosure. According to various aspects of the present disclosure, a system for providing security functions for a vehicle may include a drone 530 and a device 510 configured to be mounted on the roof of a vehicle 505. FIG. 5 shows an example embodiment in which a system according to various aspects of the present disclosure may be used during an event involving another vehicle 550. The event may be a traffic stop. The other vehicle may include a door and at least one person. For example, vehicle 550 includes door 554 and person 552. Person 552 may be a passenger of vehicle 550. In this example, vehicle 550 is north (i.e., positioned in a direction of three hundred sixty degrees) relative to a position of vehicle 505.

As shown, drone 530 is positioned in a drone port 520 of device 510. While mounted in the device 510, drone 530 is configured to capture image data. The captured image data may include an object. For example, image data captured by a camera of drone 530 may include a first object and a second object. In embodiments, each object may correspond to one or more of a person, vehicle, or building. For example, a first object may correspond to vehicle 550 and the second object may correspond to person 552. The captured image data may include image data of a second object inside a vehicle. For example, image data of person 552 may be captured by a camera of drone 530 while person 552 is still inside vehicle 550. Image data of person 552 may be captured through a window of device 510 and a window of vehicle 550.

In embodiments, a third object may also be captured in the image data by the drone. In embodiments, a third object may include one of a person, vehicle, or building. For example, image data captured by a camera of drone 530 includes an object corresponding to person 580. Person 580 may be a driver of vehicle 505. Person 580 may be a law enforcement officer. Person 580 may be user of vehicle 505. Person 580 may operate a user interface device in vehicle 505.

In embodiments, a drone may detect one or more objects in captured data and transmit data associated with each detected object. Data associated with each object may include one or more indicia associated with a detected object. Example indicia include a location in image data of the detected object, a classification of the object, and a position of the object in an area around a vehicle. The data may be transmitted from the drone to another device. For example, data comprising indicia of a first object and second object may be transmitted to one or more of a user interface device and a remote computing device. Data comprising indicia of a third object may also be transmitted to one or more of the user interface device and the remote computing device. The data may be transmitted while the drone is positioned in a drone mount. For example, a camera of drone 530 may capture image data, detect objects in the captured data, and transmit data comprising indicia of the detected objects. The indicia may be transmitted while the drone is positioned in drone mount 520. In other embodiments, a camera of a drone may capture image data of one or more objects and another component of device 510 may detect and transmit data comprising indicia associated with the detected objects. For example, a computing device of device 510 may alternately or additional detect each object in captured image data and transmit indicia of each detected object to another device. The other device may include one of a user interface device and a remote computing device.

A drone may receive flight data. For example, drone 530 may receive flight data. The flight data may be received while drone 530 is still positioned in device 510. The flight data may be received after the drone has transmitted indicia of each object detected in image data. The flight data may be received from another device. The flight data may be received via a device configured to be mounted on a vehicle. In embodiments, the other device may include one of a user interface device and a remote computing device.

In embodiments, flight data may include one or more of indicia of an object to be tracked, a relative position for a drone, and a motion response for a drone. The indicia of an object to be tracked may include one or more of an object for optical tracking and an object for positional tracking. In embodiments, an object for optical tracking may be a same object as an object for positional tracking. The indicia for an object may indicate whether an object to be tracked is an object for positional tracking or an object for optical tracking. In embodiments, indicia of an object may be interpreted as indicia of both an object for optical tracking and an object for positional tracking by default and/or absent separate indicia for each type of object. In other embodiments, separate indicia may be provided for each object type.

A drone may automatically position itself based on the flight data. In embodiments, a drone may automatically launch after flight data is received. The flight indicia may include indicia to cause drone to launch from a drone port. The flight data may initiate operation of a drone in an aerial mode. In other embodiments, a separate input may be received by a drone to cause the drone to launch. For example, a separate signal may be received via a communication circuit of the drone, aside from a signal by which the flight data may be provided to the drone provided. In these embodiments, the separate signal may be received after the flight data. Alternately or additionally, at least one or more indicia in flight data may be received by the drone prior to launch and/or prior to a separate signal.

Automatic operation of a drone based on flight data is further illustrated in FIG. 5. Based on flight data, a processing circuit may cause a drone to position itself at one or more example positions 540. The positioning in many embodiments according to the present invention includes the drone automatically flying to a position, such as one of positions 540. Positioning of a drone may include automatic positioning of the drone at a position associated with flight data.

For example, flight data may be received for position 540-1. The flight data may include indicia regarding an object corresponding to vehicle 505. Indicia in the flight data may indicate that an object for positional tracking corresponds with vehicle 505. Vehicle 505 may be captured in image data by a camera of drone 530 prior to receipt of flight data. For example, a hood of vehicle 505 may be captured in image data and available for selection as an object for positional tracking. Indicia in the flight data may indicate that an object for optical tracking corresponds with vehicle 550. In embodiments, vehicle 550 may also be captured in image data by a camera of drone 530 prior to launch of drone 530. The captured image data may be stored as event data. In this example, an object for positional tracking and an object for optical tracking are indicated as different objects in the flight data.

Indicia in the flight data may also include a relative position associated with vehicle 505. For example, indicia of a relative position may include a relative distance of two feet. Indicia of a relative position may include an azimuth of three hundred sixty degrees. Indicia of a relative position may also include an altitude value of twenty feet.

Flight data may also include indicia of a motion response. For example, indicia of a motion response may include indicia of a return motion response.

In accordance with flight data, drone 530 may automatically position itself at position 540-1. Based on the flight data, a processing circuit of drone 530 may control fans of drone 530 to travel to a position above vehicle 505 while a camera of drone 530 is oriented toward vehicle 550. By being positioned at position 540-1, a camera of drone 530 may capture a different perspective of an area around a target object, including an area in front of vehicle 550. At this position 540-1, a camera of drone 530 may also capture a different angle of view around vehicle 550, compared to other cameras that may be positioned around vehicle 505. At position 540-1, drone 530 may be disposed at an altitude equal to an altitude in the flight data (e.g., twenty feet). Position 540-1 is also at a relative distance of two feet forward of a location on vehicle 505 in accordance with a relative distance. In embodiments, a location is a center location of vehicle 50. Based on the relative distance, drone 530 is positioned above vehicle 505. Position 540-1 is also located three hundred sixty degrees ahead or relative to a center of vehicle 505 in accordance with an azimuth in the flight data. An orientation of a camera of the drone 530 is also oriented toward vehicle 550, as indicated by the thicker, short arrow in FIG. 5 at position 540-1, and in accordance with the indicia in the flight data indicating that vehicle 550 is an object for optical tracking.

From position 540-1, drone 530 may continue to orient its camera toward the object for optical tracking, vehicle 550. At position 540-1, drone 530 may track a position of the object for positional tracking, vehicle 505. Such tracking or ongoing detection of a position of the tracked object may be based on one or more of image data captured by a camera of drone 530 and/or one or more sensors of the drone 530 as discussed elsewhere herein. If vehicle 505 is determined to move, drone 530 may automatically adjust its position in accordance with indicia of a motion response in flight data. In this example, the motion response is a return motion response. Based on this motion response, a processing circuit of the drone 530 controls the drone 530 to return 542-1 to a drone port 520 upon detection of movement of vehicle 505.

In another example, flight data may be received corresponding to position 540-2. The flight data may include indicia regarding an object to be tracked corresponding to vehicle 550. Indicia in the flight data may indicate that an object for positional tracking corresponds to vehicle 550. Vehicle 550 may be captured in image data by a camera of drone 530 prior to receipt of flight data. For example, a rear of vehicle 550 may be captured in image data and render vehicle 550 available for selection as an object for positional tracking. Indicia in the flight data may indicate that an object for optical tracking corresponds with a person in vehicle 550. For example, a driver of the vehicle may correspond to indicia of an object to be tracked received in flight data. In embodiments, a person in vehicle 550 may also be captured in image data by a camera of drone 530 prior to launch of drone 530. The image data may be recorded as event data. In this example, an object for positional tracking and an object for optical tracking are indicated as different objects in the flight data.

Indicia in the flight data may also include a relative position associated with vehicle 550. For example, indicia of a relative position may include a relative distance of twenty feet. Indicia of a relative position may include an azimuth of two hundred seventy degrees. Indicia of a relative position may also include an altitude value of ten feet.

Flight data may also include indicia of a motion response. For example, indicia of a motion response may include indicia of a return motion response in flight data associated with position 540-2.

In accordance with the flight data, drone 530 may automatically position itself at position 540-2. Based on the flight data, a processing circuit of drone 530 may control fans of drone 530 to travel to position west of vehicle 550 while a camera of drone 530 is oriented toward a person in vehicle 550. By being positioned at position 540-2, a camera of drone 530 may capture image data of a person inside a vehicle prior to approach of a second person 580 to a driver side window of vehicle 550. Flight data may be received by drone 530 prior to a second person 580 exiting vehicle 505. From position 540-2, a camera of drone 530 may alternately or additional capture image data of an interaction between a second person 580 and a person in vehicle 550.

At position 540-2, drone 530 may be disposed at an altitude equal to an altitude in the flight data (e.g., ten feet). Position 540-2 is also at a relative distance of twenty feet from vehicle 550 in accordance with a relative distance. Position 540-2 is also located two hundred seventy degrees relative to vehicle 550 in accordance with an azimuth in the flight data. An orientation of a camera of the drone 530 is also oriented toward a person (not shown) in vehicle 550 as indicated by the thicker, short arrow in FIG. 5 at position 540-2 in accordance with the indicia in the flight data indicating that the person in vehicle 550 is an object for optical tracking.

From position 540-2, drone 530 may continue to orient its camera toward the object for optical tracking, a person in vehicle 550. At position 540-2, drone 530 may track and continue to track a position of the object for positional tracking, vehicle 550. Such tracking or ongoing detection of a position of the tracked object may be based on one or more of image data captured by a camera of drone 530 and/or one or more sensors of the drone 530 as discussed elsewhere herein. If vehicle 550 is determined to move, drone 530 may automatically adjust its position in accordance with indicia of a motion response in flight data. In this example, the motion response is a return motion response. Based on this motion response, a processing circuit of the drone 530 controls the drone 530 to return 542-2 to a drone port 520 upon detection of movement of vehicle 550.

In another example, flight data may be received corresponding to position 540-3. The flight data may include indicia of an object to be tracked corresponding to vehicle 550. Indicia in the flight data may indicate that an object for positional tracking corresponds with vehicle 550. Vehicle 550 may be captured in image data by a camera of drone 530 prior to receipt of flight data. For example, a rear of vehicle 550 may be captured in image data and render vehicle 550 available for selection as an object for positional tracking. Indicia in the flight data may indicate that an object for optical tracking also corresponds with vehicle 550. Alternately, flight data may only include indicia indicating that vehicle 550 is an object to be tracked and drone 530 may interpret the indicia to indicate that vehicle is both an object for positional tracking and an object for optical tracking. In this example, an object for positional tracking and an object for optical tracking may be indicated as a same object in the flight data.

Indicia in the flight data may also include a relative position associated with vehicle 550. For example, indicia of a relative position may include a relative distance of fifteen feet. Indicia of a relative position may include an azimuth of three hundred sixty degrees. Indicia of a relative position may also include an altitude value of ten feet.

Flight data may also include indicia of a motion response. For example, indicia of a motion response may include indicia of a hold motion response in flight data associated with position 540-3.

In accordance with this example flight data, drone may automatically position itself at position 540-3. Based on the flight data, a processing circuit of drone 530 may control fans of drone 530 to travel to a location north of vehicle 550 while a camera of drone 530 is oriented toward the vehicle 550 from this position. By being positioned at position 540-3, a camera of drone 530 may capture image data of one or more persons inside a front of vehicle 550 during an event. At position 540-3, drone 530 may be disposed at an altitude equal to an altitude in the flight data (e.g., ten feet). Position 540-3 is also located fifteen feet from vehicle 550 in accordance with indicia of a relative distance in the flight data. Position 540-3 is also located three hundred sixty degrees relative to vehicle 550 in accordance with an azimuth in the flight data. An orientation of a camera of the drone 530 is also oriented toward vehicle 550 as indicated by the thicker, short arrow in FIG. 5 at position 540-3. This orientation may be applied by controlling a gimbal mount of drone 530 to aim a camera of drone 530 toward vehicle 550 from position 540-3 in accordance with indicia in the flight data indicating that vehicle 550 is an object for optical tracking.

From position 540-3, drone 530 may continue to orient its camera toward the object for optical tracking, vehicle 550. At position 540-3, drone 530 may track and continue to track a position of the object for positional tracking, vehicle 550. Such tracking or ongoing detection of a position of the tracked object may be based on one or more of image data captured by a camera of drone 530 and/or one or more sensors of the drone 530 as discussed elsewhere herein. If vehicle 550 is determined to move, drone 530 may automatically adjust its position in accordance with indicia of a motion response in flight data. In this example, the motion response is a hold motion response. Based on this motion response, a processing circuit of the drone 530 controls the drone 530 to maintain 542-3 drone 530 at position 540-3 upon detection of movement of vehicle 550.

In another example, flight data may be received corresponding to position 540-4. The flight data may include indicia regarding an object corresponding to a person 552 in vehicle 550. Person 552 may be a passenger in vehicle 550. Person 552 may be positioned on a passenger side of vehicle 550. Person 552 may be positioned in vehicle 550 upon launch of drone 530 from device 510. Indicia in the flight data may indicate that an object for positional tracking corresponds with the person 552 in vehicle 550. Indicia in the flight data may indicate that an object for optical tracking also corresponds with the person 552 in vehicle 550. Person 552 in vehicle 550 may be captured in image data by a camera of drone 530 prior to receipt of flight data. For example, person 552 in vehicle 550 may be captured in image data through a window of vehicle 550 and a window of device 510. Based on this captured image data, indicia of a detected object corresponding to person 552 may be generated. The generated indicia may enable person 552 to be available for selection as an object for positional tracking. In embodiments, person 552 in vehicle 550 may be captured in image data by drone 530 prior to launch of drone 530. The image data may be stored as event data in drone 530. In this example, an object for positional tracking and an object for optical tracking are indicated as a same object in the flight data.

Indicia in the flight data may also include a relative position associated with person 552. For example, indicia of a relative position may include a relative distance of thirty feet. Indicia of a relative position may include an azimuth of ninety degrees. Indicia of a relative position may also include an altitude value of twenty feet.

Flight data may also include indicia of a motion response. For example, indicia of a motion response may include indicia of a follow motion response in flight data associated with position 540-2.

In accordance with this example flight data, drone may automatically position itself at position 540-4. Based on the flight data, a processing circuit of drone 530 may control fans of drone 530 to travel to a position east of person 552 in vehicle 550 while a camera of drone 530 is oriented toward the person 552 in the vehicle 550. From position 540-4, a camera of drone 530 may capture image data of a person and activity on an opposite side of vehicle from person 580. At position 540-4, drone 530 may be disposed at an altitude equal to an altitude in the flight data (e.g., twenty feet). This altitude may be sufficient to prevent person 552 from exiting vehicle 552 and making physical contact with drone 530. Position 540-4 is also located ninety degrees relative to person 552 in accordance with an azimuth in the flight data. Position 540-4 is also located thirty feet from person 552 when person 552 is in vehicle 550 in accordance with relative distance in the flight data. An orientation of a camera of the drone 530 is also oriented toward person 552 as indicated by the thicker, short arrow in FIG. 5 at position 540-4 in accordance with the indicia in the flight data.

From position 540-4, drone 530 may continue to orient its camera toward the object for optical tracking, person 552 in vehicle 550. At position 540-4, drone 530 may track and continue to track a position of the object for positional tracking, person 552 in vehicle 550. Such tracking or ongoing detection of a position of the tracked object may be based on one or more of image data captured by a camera of drone 530 and/or one or more sensors of the drone 530 as discussed elsewhere herein.

If person 552 is detected to move, drone 530 may automatically adjust its position in accordance with indicia of a motion response in flight data. In this example, the motion response is a follow motion response. Based on this motion response, a processing circuit of the drone 530 controls the drone 530 to follow 542-4 person 552.

For example, movement of person 552 may be detected by drone 530. The movement may correspond to person 552 exiting 556 vehicle 550 after opening door 554. A processing circuit of drone 530 may control drone 530 to move in a direction based on a changed position of person 552. For example, a position of drone may be adjusted in a direction toward a changed position of person 552. As person 552 continues to move 558, drone 530 may continue to follow 542-4 person 552. While following person 552, drone 530 may continue to maintain a relative position from the object for positional tracking, person 552. While following person 552, drone 530 may continue to orient a camera toward the object for optical tracking, person 552. Drone 530 may continue to follow person 552 until person 552 discontinues movement. In embodiments, drone 530 may also continue to follow an object for positional tracking until a limit associated with geofence data is reached. At a position associated with a limit in geofence data, a drone may automatically execute a hold motion response or a return motion response. Indicia of geofence data may be included in flight data received by the drone. In other embodiments, a memory of drone 530 may include default indicia of geofence data.

Positions 540 are illustrative; other positions may also be included at which a drone positions itself automatically after launch. Positions aside from and/or in addition to positions 540 may be employed, selected, or otherwise included in embodiments according to various aspects of the present disclosure.

In embodiments according to various aspects of the present disclosure, a chassis may include a plurality of drone ports. Systems according to various aspects of the present disclosure may include the chassis and a plurality of drones. The chassis and each drone port may be configured to receive a drone in a particular orientation. A particular orientation may include an orientation in which a camera of the drone is oriented upon landing or otherwise being positioned in the chassis. A drone port may comprise one or more surfaces (e.g., guides, channels, posts, etc.) configured to receive a drone in a particular orientation. Each drone port in a chassis may be configured to receive a drone in a different orientation. For example, a drone port may be configured to receive a first drone in a first orientation associated with a first direction. A drone port in a same chassis may be configured to receive a second drone in a second orientation associated with a second direction. The first direction and second direction may be in different directions. The first direction and second direction may be opposite directions.

Figure 6:
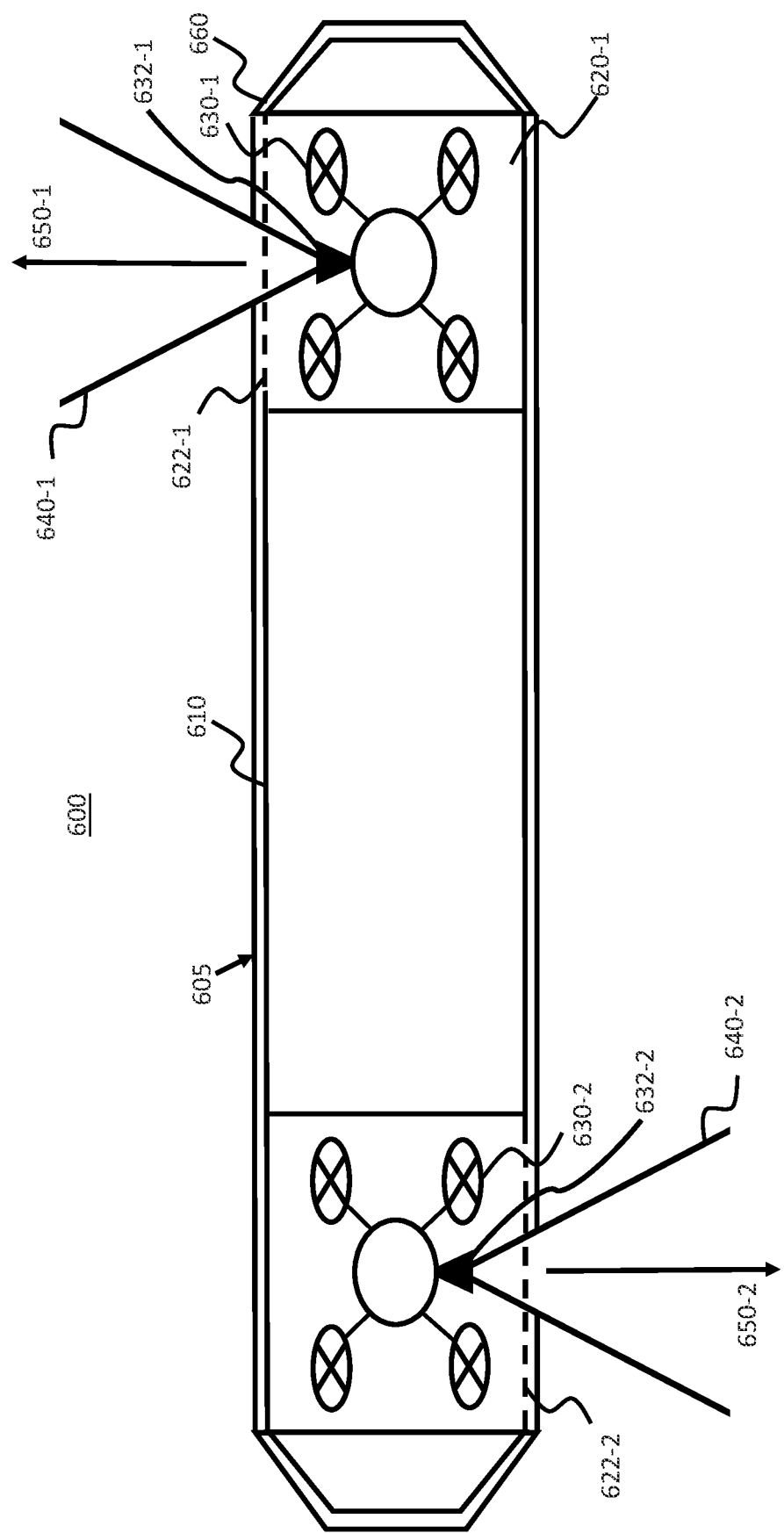
FIG. 6 is a diagram of a chassis according to various aspects of the present disclosure.

FIG. 6 is a diagram of a chassis according to various aspects of the present disclosure. System 600 includes a device 605 configured to be mounted on a vehicle. In embodiments. system 600 includes a device 605 configured to be mounted on a vehicle and drones 630. Device 605 includes a chassis and a plurality of drone ports 620 integrated in the chassis. The drone ports 620 include windows 622. Each drone 630 includes a camera 632. Each camera 632 has an associated angle of view 640. Each camera 632 is oriented in a direction 650. A direction 650 may correspond to a direction of a center of an angle of view 640 of a camera 632. A direction 650 may be in a direction associated with a direction relative to a vehicle and/or portion of a vehicle on which device 605 is configured to be mounted. For example, a direction may include one or more of a forward-facing direction of a vehicle, a rear-facing direction of a vehicle, a direction of a passenger side of a vehicle, a direction of a driver side of a vehicle. A direction 650 may include a direction from a camera 632 through a window 622 of the drone port. Device 605 may be a light bar, further including lights 670 positioned at and/or around a periphery of chassis 610.

For example, device 605 includes a first drone port 620-1. First drone port 620-1 is positioned at a first end of device 605 and chassis 610. First drone port 620-1 is positioned at an asymmetrical location within device 605 and chassis 610. First drone port 620-1 may be positioned on a side of device 605 that corresponds to a passenger side of a vehicle on which device 605 is configured to be mounted. Drone port 620-1 includes a first window 622-1. First window 622-1 is disposed along a first side of the drone port. The first side may be integrated with an elongated first side of device 605. The first side may be integrated with an elongated first side of chassis 110. First drone port 620-1 includes an enclosure configured to house first drone 630-1.

First drone 630-1 includes a first camera 632-1. First camera 632-1 is physically integrated with first drone 630-1. For example, first camera 632-1 may be integrated with first drone 630-1 via a gimbal mount. First camera 632-1 has a first angle of view 640-1. First camera 632-1 is oriented in a first direction 650-1. First camera 632-1 is oriented in a first direction 650-1 when positioned in first drone port 620-1. First direction 650-1 includes a direction from first camera 632-1 through a first window 622-1 of first drone port 620-1. In embodiments, first direction 650-1 is a forward-facing direction when device 605 is mounted on a vehicle. First direction 650-1 is along a passenger side of a vehicle when device 605 is mounted on a vehicle.

In embodiments, device 605 also includes a second drone port 620-2. Second drone port 620-2 is positioned at a second end of device 605 and chassis 610. The second end is an opposite end of device 605 and chassis 610 relative to a position of a first drone port 620-1. Second drone port 620-2 is positioned at an asymmetrical location within device 605 and chassis 610. Second drone port 620-2 may be positioned on a side of device 605 that corresponds to a driver side of a vehicle on which device 605 is configured to be mounted. Drone port 620-2 includes a second window 622-2. Second window 622-2 is disposed along a second side of the drone port. The second side is integrated with an elongated second side of device 605. The second side may be integrated with an elongated second side of chassis 110. Accordingly, windows 622 are disposed on different sides of chassis 610. Windows 610 are disposed on opposite sides of chassis 610. Windows 610 may be disposed parallel to each other, but configured to enable a respective camera 632 to capture images of objects external to chassis 610 in different directions. Second drone port 620-2 includes an enclosure configured to house second drone 630-2.

Second drone 630-2 includes a second camera 632-2. Second camera 632-2 is physically integrated with second drone 630-2. For example, second camera 632-2 may be integrated with second drone 630-2 via a gimbal mount. Second camera 632-2 has a second angle of view 640-2. Second angle of view 640-2 is a different angle of view from first angle of view 640-1. The angles of view 640 are different for each drone 630 when each drone 630 is positioned in chassis 610. Second angle of view 640-2 enables second camera 632-2 to capture different image data compared to a first angle of view 640-1. Each object represented in image data for a second angle of view 640-2 may be different from each object represented in image data for a first angle of view 640-1. In embodiments, second angle of view 640-2 does not overlap with a first angle of view 640-1. Second camera 632-2 is oriented in a second direction 650-2. Second camera 632-2 is oriented in a second direction 650-2 when positioned in second drone port 620-2. In embodiments, second direction 650-2 is different from first direction 650-1. In embodiments, second direction 650-2 is opposite first direction 650-1. Second direction 650-2 includes a direction from second camera 632-2 through a second window 622-2 of second drone port 620-2. In embodiments, second direction 650-2 is a rear-facing direction when device 605 is mounted on a vehicle. In embodiments, second direction 650-2 is along a driver side of a vehicle when device 605 is mounted on a vehicle. Based on different first direction 650-1 and second direction 650-2, each camera 632 may capture image data comprising different sets of objects in an area around a device 605. The different captured image data may provide a more complete record of events that occur around a vehicle on which device 605 is mounted. In embodiments, objects captured in image data from each drone 632 may be available for selection as a tracked object and subsequent automatic positioning of one or more drones relative thereto. In embodiments, captured image data from each drone 630 may be stored as event data in a same storage system in device 605. In embodiments, device 605 may include a storage system and other components, including one or more components disclosed with respect to FIG. 3.

Figure 7:
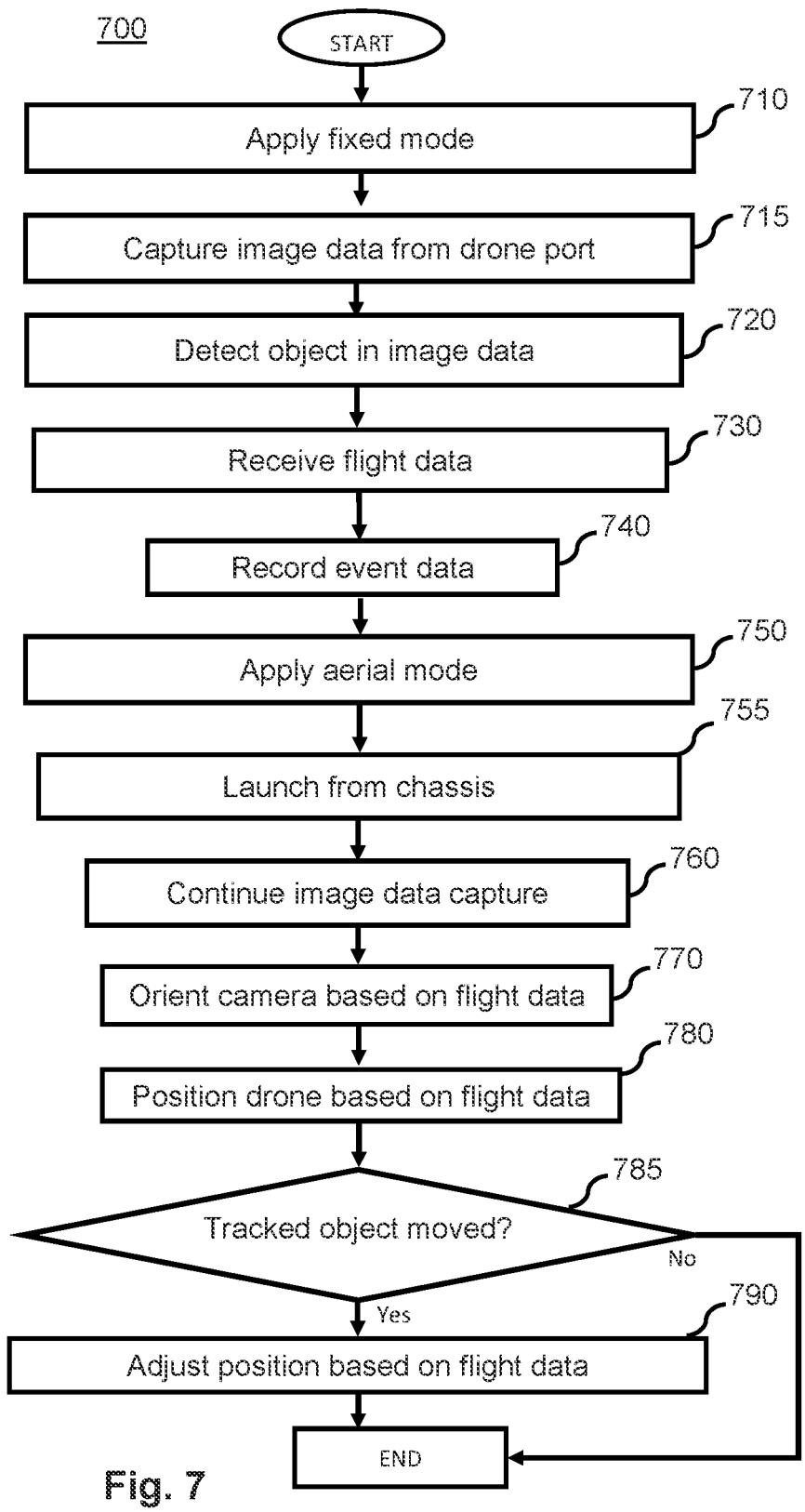
FIG. 7 is a block diagram of a method performed by a drone to provide security functions for a vehicle according to various aspects of the present disclosure.

FIG. 7 is a block diagram of a method performed by a drone to provide security functions for a vehicle according to various aspects of the present disclosure. In embodiments, a processing circuit of a drone may execute instructions from a computer-readable storage medium, that when executed, cause the drone to perform one or more blocks of FIG. 7. In embodiments, a drone may include a processing circuit and one or more other components disclosed here. The drone may be configured to execute one or more functions associated with one or more blocks shown in FIG. 7 and/or disclosed elsewhere herein.

At start, a drone may be disposed within a drone port. The drone port may be included in a chassis. The chassis may be mounted on a vehicle. The vehicle may be in motion. In other embodiments, the vehicle may be stationary.

After starting, a drone may apply a fixed mode 710. In a fixed mode, settings associated with a fixed mode may be applied by a drone. Applying a fixed mode may include operating the drone in a fixed mode for a period of time. A processing circuit of a drone may apply one or more settings of the fixed mode to control one or more components of the drone. For example, the fans of the drone may be deactivated in a fixed mode. Applying a fixed mode may include applying a fixed mode while a vehicle on which a drone port for a drone may be in motion. Applying a fixed mode may include operating the drone according to one or more settings in mode data for the fixed mode for a period of time.

In a fixed mode, a setting may limit operation of a gimbal mount. A processing circuit of the drone may limit movement of the gimbal mount in one or more directions. For example, movement of the camera in a vertical direction may be prevented via gimbal mount. The camera may only be permitted to rotate, move, or otherwise be variably oriented in a horizontal direction via a gimbal mount while the drone is operated in a fixed mode. For example, a camera be rotated in a horizontal direction in a fixed mode in order to detect an object, including for purposes of detecting a potential vehicle collision or automatic license plate reading. In other embodiments, movement of the camera may be prevented in multiple directions. A processing circuit may completely prevent a gimbal from rotating, moving, or otherwise variably orienting a camera. A gimbal mount may not be powered or may be otherwise rendered inactive in a fixed mode.

In a fixed mode, a setting may be applied to render a long-range communication circuit of the drone inactive. A setting of mode data for a fixed mode may cause a processing circuit of a drone to deactivate a long-range communication circuit of the drone. In a fixed mode, long-range communications may be received by the drone via radios and other radio communication components of the chassis. For example, a remote computing device may transmit and receive data from a drone via a radio communication circuit mounted in the chassis. The radio communication circuit of the chassis may transmit and receive long-range communication signals with the remote computing device, while providing and receiving data for these signals via direct or indirect communication within the chassis. The availability of long-range communication circuit in the chassis may prevent a need for any similar such duplicate communication circuit to be activated in the drone in a fixed mode.

In a fixed mode, a global positioning system circuit may be inactive. A setting of mode data for a fixed mode may cause a processing circuit of a drone to deactivate a GPS receiver of the drone. A drone may employ GPS position data received from the chassis, rather than a GPS receiver within the drone itself. Duplicate or similar position data from a GPS receiver of the drone itself may not be necessary or useful, when the drone is positioned in the chassis and able to obtain same or similar positioning data from the chassis.

In a fixed mode, an infrared camera may be inactive. A setting of mode data for a fixed mode may cause a processing circuit of a drone to deactivate an infrared camera of the drone. An infrared camera may not be useful when a drone is positioned in a chassis. For example, an infrared camera may be employed by a drone during search and rescue activity. However, in a fixed mode, an infrared camera of a drone may be positioned too distant from a search area, preventing image data from an infrared camera from providing image data in which an object to be rescued may be identified. In a fixed mode, an infrared camera of a drone an object to be rescued may be observed in different manners, including visually by a user in a vehicle or in image data captured by a non-infrared camera.

In a fixed mode, an angle of view of a camera may be different from an angle of view applied or configured to be applied during an aerial mode. A setting of mode data for a fixed mode may cause a processing circuit of a drone to adjust an angle of view of a camera of the drone. An angle of view applied or able to be applied in one mode may be greater than an angle of view applied or able to be applied in the other mode. A range of view angles may be greater one mode in comparison with a range of angles applied or able to be applied in the other mode. For example, in a fixed mode, an angle of view of image data captured by the camera may be set to a maximum angle of view. Such a field of view may enable a higher number of objects to be captured in image data. Such relative image data may be beneficial for object detection. Other cameras on the chassis may also have a smaller angle of view, decreasing a need for a narrower angle of view from the camera of the drone as well.

At block 715, a camera of the drone may capture image data. Capturing image data may include capturing image data through a window of a drone port. Capturing image data may include capturing image data while a drone is positioned in a drone port. Capturing image data may include capturing image data prior to opening of a motorized access of a drone port. Capturing image data may include capturing image data while a vehicle on which the drone port is mounted is in motion. Capturing image data may include capturing image data while a vehicle on which the drone port is mounted is stationary.

In embodiments, capturing image data may include executing one or more modules with a processing circuit of the drone. The modules may be executed in accordance with settings for a fixed mode stored in mode data. The one or more modules, when executed by the processing circuit, may cause image data to be captured by a camera of the drone and provided to the processing circuit for further processing by the one or more modules. For example, capturing image data may include executing a license plate reader module. Capturing image data may include executing an aerial mapping module. Capturing image data may include executing a collision detection module. Executing at least one module by a processing circuit may cause image data to be captured by a camera of a drone. In other embodiments, a drone may capture image data 715 independent of and/or prior to execution of a module by a processing circuit of a drone.

At block 720, an object may be detected in the captured image data. Detecting an image data may include executing an object detector module and generating indicia of a detected object. Detection may include determining one or more pixels associated with an object in the captured image data. Detection of an object may generate output data associated with the pixels determined to represent an object. Detecting an object may also include classifying an object. In embodiments, detecting an object may include determining a position of the object. Detecting an object may include generating an output comprising indicia of one or more of a location in image data of the object, a classification of the object, and a position of the object.

Detecting an object may include transmitting indicia of a detected object. Detecting an object may include transmitting indicia of a detected object to a user interface device. Detecting an object may include transmitting indicia of a detected object to a remote computing device. Detecting an object may include transmitting indicia of a detected object via a device configured to be mounted on a vehicle. For example, detecting an object may include transmitting the indicia via a communication circuit in a chassis configured to be mounted on a vehicle.

In other embodiments, detecting an object may be performed by a computing device, rather than the drone. Detecting an object according to these embodiments may include the computing device receiving image data captured by a drone. Detecting an object may include executing an object detector module by a processing circuit of the computing device. Detecting the object in these embodiments may include the computing device transmitting output data comprising indicia of the detected object. The output data may be transmitted to another device, such as a remote computing device and/or a user interface device.

At block 730, flight data is received. Receiving flight data may include receiving flight data by the drone. The flight data may be received via a device configured to be mounted on a vehicle. The flight data may be received from a remote computing device. The flight data may be received from a user interface device. One or more of the remote computing device and the user interface device may have receive one or more indicia of a detected object. In response, a drone may receive flight data comprising indicia related one or more of the detected objects. The related indicia may indicate an object to be tracked corresponds to an object previously detected in captured image data.

The flight data may include indicia. Indicia in the flight data may be associated with a manner in which the drone should automatically operate after launch. The indicia may include indicia by which a processing circuit of a drone subsequently automatically controls one or more components of the drone. The indicia may be included in flight data received by the drone. The flight data may be received after the image data is captured by the drone.

At block 740, event data may be recorded. Recording event data may include storing image data captured by a camera of the drone in memory. Recording event data may include storing buffered image data with image data subsequently captured by a camera of the drone. Accordingly, event data stored in memory of the drone may include image data captured prior to launch of a drone. In embodiments, a drone may record event data on receipt of flight data. The drone may record event data automatically upon receiving the flight data.

At block 750, a drone may apply an aerial mode. Applying an aerial mode may include applying settings associated with an aerial mode in mode data. Applying an aerial mode may include operating a drone in an aerial mode for a period of time. A processing circuit of a drone may apply one or more settings associated with an aerial mode to control one or more components of the drone.

For example, fans are activated by the drone in an aerial mode. The fans may be activated constantly during an aerial mode. The fans may enable the drone to exit a chassis. The fans may enable the drone to exit a drone port. In an aerial mode, fans in an aerial mode may be activated in accordance with flight data. Fans in an aerial mode may be controlled during flight of the drone in accordance with flight data.

In contrast to a fixed mode, a gimbal mount may be permitted a higher range of motion in an aerial mode. For example, a processing circuit in a drone may control or enable a gimbal mount to move a camera in both vertical and horizontal directions in an aerial mode. A camera may have a full range of motion in an aerial mode. A full range of motion may correspond to a full range of motion to which a gimbal mount may be oriented. A gimbal mount may be powered and activated in the aerial mode. A camera may be permitted, controlled, enabled, or otherwise configured to be oriented in at least one more direction than when the drone is operated in a fixed mode. In an aerial mode, a camera may be rotated in multiple directions, for example, in order to track an object in multiple directions in three-dimensional space. Different values associated with the gimbal mount for each of the fixed mode and aerial mode may be stored in memory and applied by a processing circuit to control the gimbal mount in accordance with each mode.

In an aerial mode, a long-range communication circuit may be activated, so that the drone may be able to transmit and receive long-range communication signals with various devices, including the chassis and the remote computing device. The circuit may be activated in accordance with mode data for an aerial mode processed and applied by a processing circuit of the drone.

In an aerial mode, a GPS receiver of the drone may be activated, enabling a drone to determine its position independent of a position of a chassis. The receiver may be activated in accordance with mode data for an aerial mode processed and applied by a processing circuit of the drone.

In an aerial mode, an infrared camera of a drone may be activated. Once activated in an aerial mode, an infrared camera may capture additional image data in which an object may be detected. The camera may be activated in accordance with mode data for an aerial mode processed and applied by a processing circuit of the drone.

In an aerial mode, an angle of view of a camera may be lower or selectively set to a lower angle of view by the drone. In an aerial mode, an object to be tracked in image data may be indicated in flight data received by the drone. A lower angle of view may enable the tracked object to be captured at a higher resolution by the drone. Different angles of view may be set, for example, by adjusting a focal length of the camera. A processing circuit of the drone may select different focal lengths for a camera or enable or disable different focal lengths to be selected for a camera in accordance whether a drone is operated in a fixed mode or an aerial mode, thereby enabling a different angle of view to be captured in image data for the different modes. A processing circuit may adjust an angle of view of a camera in accordance with settings in mode data for an aerial mode.

At block 750, a drone is launched. Launching the drone may include launching the drone from a drone port. Launching the drone may include causing the drone to exit a chassis. A processing circuit of the drone may control fans of the drone to launch the drone from the drone port. In embodiments, a drone may launch based on receipt of flight data. The drone may launch automatically upon receiving the flight data. The flight data may comprise indicia of an object to be tracked. After launch, the drone may track the object based on the received flight data. Tracking the object may comprise one or more functions as described with respect to blocks 755-790.

In embodiments, launching a drone may include selecting a payload among a plurality of payloads. The plurality of payloads may include two or more of a second camera, an infrared camera, radio communication equipment, a spotlight, and rescue equipment. The payload may be selected prior to launch. The payload may be selected immediately prior to launch of the drone from a drone port. Selecting a payload may include securing the payload to the drone. The payload may be secured via a mount of the drone. A mount of the drone may selectively attach the payload to the drone.

At block 755, a camera of the drone may continue to capture image data. Continuing to capture image data may include capturing second image data. Continuing to capture image data may include capturing image data during launch. Continuing to capture image data may include capturing image data while a drone is positioned external to a drone port. Continuing to capture image data may include capturing image data after a motorized access of a drone port has been opened. In embodiments, continuing to capture image data may include continuing to record captured image data as event data. The captured image data may be continuously stored as flight data in memory of the drone. The captured image data may be continuously stored as event data during launch of the drone. The captured image data may be continuously stored as event data after launch of the drone. The camera of the drone may be configured to capture data continuously before and after launch. The continuously captured data may be stored together in memory. The continuously captured data may be stored as a single set of event data. Continuing to capture image data may include continuing to capture image data with the camera after launch and storing the image data captured after launch continuously with the image data captured while the drone was positioned in the drone port. The continuously captured image data may be recorded in a single file. The continuously captured image data may be stored with image data captured while the drone was positioned in the drone port. The continuously captured image data may include video data. The video data may include image data captured prior to launch of the drone. The same video data may include image data captured during and after launch of the drone. The video data may be recorded in a single video file. The video data may be stored as a single video file. In embodiments, the drone may continue to capture image data based on receipt of flight data. The drone may continue to capture image data automatically upon receiving the flight data.

In embodiments, continuing to capture image data may include executing one or more modules with a processing circuit of the drone. The modules may be executed in accordance with settings for an aerial mode stored in mode data. The one or more modules, when executed by the processing circuit, may cause image data to be captured or continued to be captured by a camera of the drone and provided to the processing circuit for further processing by the one or more modules. Continuing to capture image data may include executing at least one module by a processing circuit of the drone. For example, capturing image data may include executing an object tracking module. Execution of other modules, such as license plate reading module, an aerial mapping module, and a collision detection module may be discontinued and or not performed by a processing circuit in accordance with settings for an aerial mode. In other embodiments, a drone may continue to capture image data 760 independent of execution of a module by a processing circuit of a drone.

At block 760, a camera of a drone may be oriented based on flight data. Orienting a camera may include orienting a camera toward a tracked object. Orienting a camera may include orienting a camera toward an object for optical tracking. Orienting a camera may include controlling a gimbal mount of a drone based on a tracked object. Orienting a camera may include adjusting a camera based on a position of a tracked object in captured image data. Orienting a camera may include continuously controlling a gimbal mount of a drone based on a position of a tracked object over time. Orienting a camera based on flight data may include executing an object tracking module with a processing circuit of the drone to detect a position of a tracked object and orienting a camera based on the detected position. Orienting a camera based on flight data may include determining a change in position of a tracked object by executing an object tracking module to determine a changed position of the tracked object and orienting a camera based on the changed position.

At block 770, a drone may be positioned based on flight data. Positioning a drone based on flight data may include controlling one or more fans of a drone to move a drone to a location in accordance with the flight data. Positioning a drone based on flight data may include positioning the drone based on a tracked object. Positioning a drone based on flight data may include positioning the drone based on an object for positional tracking indicated in the flight data. Positioning a drone may include positioning the drone based on a relative position indicated in the flight data. Positioning a drone may include positioning the drone based on one or more of an azimuth, altitude, and relative distance in the flight data. Positioning the drone may include executing an object tracking module with a processing circuit of the drone to detect a position of a tracked object and positioning the drone based on the detected position. Positioning the drone may include executing an object tracking module with a processing circuit of the drone to detect an initial position of a tracked object upon launch of the drone.

At block 780, a drone may determine whether a tracked object has moved. The tracked object may be an object for positional tracking. Determining whether a tracked object has moved may include detecting movement of the tracked object. Determining whether a tracked object has moved may include executing an object tracking module with a processing circuit of the drone to detect a current position of the tracked object. Determining whether a tracked object has moved may include comparing the current position to a reference position of the tracked object. A reference position may include an initial position of the tracked object. Determining whether a tracked object has moved may include determining whether a current position of the tracked object is different from a reference position of the tracked object. Determining whether a tracked object has moved may include determining whether a current position of the tracked object differs from a reference position of the tracked object by an amount greater than a threshold distance. Determining whether a tracked object has moved may include determining an object has moved when a current position is different from a reference position. Determining whether a tracked object has moved may include determining an object has moved when a current position differs from a reference position by greater than a threshold distance. Determining whether a tracked object has moved may include maintaining a position when a tracked object is determined to not have moved. Determining whether a tracked object has moved may include maintaining a position while movement is not detected at block 785. If no movement of a tracked object is determined at block 780, processing may end.

If movement of a target object is determined at block 780, processing may move to block 790. At block 790, a position of the drone may be adjusted. Adjusting the position of the drone may include adjusting the position of the drone based on flight data. Adjusting the position of the drone may include adjusting the position in accordance with a motion response in flight data. The motion response may include indicia of a position adjustment for the drone to automatically make upon determining the target object has moved. The motion response may include indicia of a position adjustment for the drone to automatically make upon detecting movement of the tracked object. The motion response may include a position adjustment that corresponds to one of maintaining a position, following the tracked object, and returning to a drone port.

In embodiments, flight data may include indicia of a hold motion response. The flight data may include indicia of a position adjustment that corresponds to maintaining a position of the drone. The position may be maintained at a current position of the drone. The position may be maintained at a position of the drone upon detecting or determining movement of the tracked object. The position may be maintained at a position corresponding to a relative position in flight data. Adjusting the position of the drone may include maintaining a position of the drone in accordance with a hold motion response in flight data. For example, a processing circuit may control one or more fans to continue positioning of the drone at a current position in accordance with a hold motion response. In accordance with a hold motion response, adjusting the position of the drone may include discontinuing adjusting a position of a drone based on a relative position in flight data.

In embodiments, flight data may include indicia of a follow motion response. The flight data may include indicia of a position adjustment that corresponds to following the tracked object. Adjusting the position of the drone may include adjusting a position of the drone in accordance with the follow motion response in flight data. For example, a processing circuit may control one or more fans to adjust a position of the drone in accordance with a follow motion response. Adjusting the position of the drone may include adjusting a position of the drone in accordance with the follow motion response and a relative position in flight data. Adjusting the position of the drone may include adjusting a position of the drone in accordance with a position of the tracked object. For example, a processing circuit may control one or more fans to adjust a position of the drone to cause the drone to follow the tracked object. A processing circuit may control one or more fans to adjust a position of the drone to cause the drone to move in a direction toward a position of the tracked object. A processing circuit may control one or more fans to adjust a position of the drone to cause the drone to move in a direction associated with a direction of motion of the tracked object.

Adjusting the position of the drone may include adjusting a position of the drone in accordance with a return motion response in flight data. For example, a processing circuit may control one or more fans to adjust a position of the drone in accordance with a return motion response. Adjusting the position of the drone may include adjusting a position of the drone to return to a drone port in accordance with a return motion response. For example, a processing circuit may control one or more fans to adjust a position of the drone to cause the drone to fly back to and land in a drone port from which it previously launched.

Upon adjusting a position of the drone, processing may end.

In this description herein of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is noted that these connections are general and, unless specified otherwise, may be direct or indirect, wired or wireless, and that the specification is not intended to be limiting in this respect.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system for providing security functions to a vehicle, comprising:
   a chassis configured to be mounted on top of the vehicle, the chassis including a drone port; and
   a drone including a camera, wherein while the drone is positioned in the drone port:
     the camera of the drone is configured to capture image data of objects outside of the chassis; and
     the drone is configured to receive flight data comprising indicia of an object in the captured image data to be tracked.

2. The system of claim 1, wherein the drone port includes a window through which the camera of the drone is configured to capture the image data of objects outside of the chassis.

3. The system of claim 1, wherein the drone port is positioned at an end of the chassis.

4. The system of claim 1, wherein the flight data includes indicia of one or more of a relative position and a motion response for the drone.

5. The system of claim 4, wherein the relative position includes at least one of an azimuth value, an altitude value, a relative distance value, and geofencing data.

6. The system of claim 4, wherein the motion response for the drone includes indicia of a position adjustment for the drone to automatically make upon detecting movement of the object to be tracked.

7. The system of claim 6, wherein the position adjustment corresponds to one of maintaining a position, following the object to be tracked, and returning to the drone port.

8. The system of claim 1 wherein the drone is configured to launch from the chassis and automatically track the object based on the received flight data.

9. The system of claim 8, wherein automatically tracking the object based on the received flight data includes automatically positioning the drone at a position indicated in the flight data.

10. The system of claim 1, wherein the drone is configured to store the image data in a memory of the drone while the drone is positioned in the drone port.

11. The system of claim 10, wherein the camera of the drone is configured to capture second image data after the drone launches from the chassis and store the second image data in the memory with the image data captured while the drone was positioned in the drone port.

12. The system of claim 1, comprising a mobile data terminal in communication with the drone, the mobile data terminal disposed within the vehicle and configured to transmit the flight data to the drone while the drone is positioned in the drone port.

13. The system of claim 1, wherein the drone is configured to:
process the captured image data to detect the object in the image data;
generate indicia of the detected object in the image data; and
transmit the indicia of the detected object from the drone.

14. The system of claim 1, wherein the chassis comprises a radio communication circuit configured to communicate with a remote computing device and the drone is configured to receive the flight data from the remote computing device via the radio communication circuit while the drone is positioned in the drone port.

15. The system of claim 1, wherein the drone is configured to detect movement of the object to be tracked and adjust a position of the drone when the movement of the tracked object is detected.

16. A method performed by a drone to provide security functions for a vehicle, the method comprising:
capturing image data with a camera of the drone while the drone is positioned in a drone port of a chassis configured to be mounted on the vehicle;
receiving flight data comprising indicia of an object in the captured image data to be tracked;
launching from the chassis; and
tracking the object based on the received flight data, wherein capturing the image data comprises:
processing the captured image data to detect the object in the image data;
generating indicia of the detected object in the image data; and
outputting the indicia of the detected object from the drone, and wherein the indicia of the detected object is output to a display positioned within the vehicle.

17. The method of claim 16, wherein the flight data is received from a user interface device positioned within the vehicle after the indicia of the detected object is output to the user interface device.

18. The method of claim 16, wherein the flight data includes a relative position, and wherein the relative position includes at least one of an azimuth value, an altitude value, a relative distance value, and geofencing data.

19. The method of claim 16, wherein the flight data includes a motion response for the drone, the motion response for the drone includes indicia of a position adjustment for the drone to automatically make upon detecting movement of the tracked object, and the position adjustment corresponds to one of maintaining a position, following the tracked object, and returning to the drone port.

20. The method of claim 16, wherein tracking the object comprises capturing second image data with the camera after launch and storing the second image data captured after launch continuously with the image data captured while the drone was positioned in the drone port.

* * * * *